(12) United States Patent
Ha et al.

(10) Patent No.: US 10,367,548 B2
(45) Date of Patent: Jul. 30, 2019

(54) ELECTRONIC DEVICE AND OPERATION METHOD THEREFOR

(71) Applicant: Samsung Electronics Co., Ltd., Suwon-si, Gyeonggi-do (KR)

(72) Inventors: Mincheol Ha, Suwon-si (KR); Seho Park, Yongin-si (KR); Jung-Oh Sung, Suwon-si (KR); Ju-Hyang Lee, Suwon-si (KR); Kwangseob Kim, Suwon-si (KR); Dongzo Kim, Yongin-si (KR); Yusu Kim, Yongin-si (KR); Keumsu Song, Seoul (KR); Jae-Woong Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/777,506

(22) PCT Filed: Nov. 14, 2016

(86) PCT No.: PCT/KR2016/013084
§ 371 (c)(1),
(2) Date: May 18, 2018

(87) PCT Pub. No.: WO2017/086663
PCT Pub. Date: May 26, 2017

(65) Prior Publication Data
US 2018/0331726 A1    Nov. 15, 2018

(30) Foreign Application Priority Data

Nov. 18, 2015   (KR) .................. 10-2015-0162128

(51) Int. Cl.
*H01F 5/00* (2006.01)
*H02J 7/02* (2016.01)
(Continued)

(52) U.S. Cl.
CPC .......... *H04B 5/0081* (2013.01); *H01F 5/003* (2013.01); *H01F 27/365* (2013.01); *H01F 38/14* (2013.01);
(Continued)

(58) Field of Classification Search
CPC .. H04B 5/0081; H04B 5/0037; H04B 5/0031; H02J 50/80; H02J 50/12; H02J 50/20;
(Continued)

(56) References Cited

U.S. PATENT DOCUMENTS

2009/0001930 A1   1/2009   Pohjonen
2014/0210406 A1   7/2014   Na et al.
(Continued)

FOREIGN PATENT DOCUMENTS

KR   10-2014-0053758 A   5/2014
KR   10-2014-0061131 A   5/2014
(Continued)

OTHER PUBLICATIONS

European Patent Office; Extended European Search Report of Application No. 16866615.4-1202; dated Oct. 2, 2018; pp. 1-7; Munich, Germany.

*Primary Examiner* — Nguyen T Vo
(74) *Attorney, Agent, or Firm* — Jefferson IP Law, LLP

(57) ABSTRACT

An electronic device and an operating method thereof according to various embodiments are capable of releasing a connection between a first antenna and a first magnetic field module, receiving power wirelessly through the first antenna by a second magnetic field module coupled to the first antenna, coupling the first antenna and the first magnetic field module, and performing first short range communication through the first antenna by the first magnetic field module.

12 Claims, 20 Drawing Sheets

(51) Int. Cl.
*H04B 5/00* (2006.01)
*H01F 27/36* (2006.01)
*H01F 38/14* (2006.01)
*H02J 50/12* (2016.01)
*H02J 50/20* (2016.01)
*H02J 50/40* (2016.01)
*H02J 50/70* (2016.01)
*H02J 50/80* (2016.01)

(52) U.S. Cl.
CPC .............. *H02J 7/025* (2013.01); *H02J 50/12* (2016.02); *H02J 50/20* (2016.02); *H02J 50/40* (2016.02); *H02J 50/70* (2016.02); *H02J 50/80* (2016.02); *H04B 5/0037* (2013.01); *H04B 5/0031* (2013.01)

(58) Field of Classification Search
CPC . H02J 50/40; H02J 50/70; H02J 7/025; H01F 5/003; H01F 27/365; H01F 38/14
See application file for complete search history.

(56) References Cited

U.S. PATENT DOCUMENTS

| | | |
|---|---|---|
| 2015/0065041 A1 | 3/2015 | Ahn |
| 2015/0229158 A1 | 8/2015 | Endo et al. |
| 2016/0149416 A1 | 5/2016 | Ha et al. |
| 2016/0336791 A1 | 11/2016 | Na et al. |
| 2018/0219427 A1* | 8/2018 | Baek .................. H01F 38/14 |

FOREIGN PATENT DOCUMENTS

| | | |
|---|---|---|
| KR | 10-2016-0061228 A | 5/2016 |
| WO | 2010/093969 A2 | 8/2010 |
| WO | 2013/032205 A2 | 3/2013 |
| WO | 2013/085108 A1 | 6/2013 |
| WO | 2013-151296 A1 | 10/2013 |
| WO | 2013-180367 A1 | 12/2013 |

* cited by examiner

ELECTRONIC DEVICE AND OPERATION METHOD THEREFOR

CROSS-REFERENCE TO RELATED APPLICATION(S)

This application is a U.S. National Stage application under 35 U.S.C. § 371 of an International application number PCT/KR2016/013084, filed on Nov. 14, 2016, which is based on and claimed priority of a Korean patent application number 10-2015-0162128, filed on Nov. 18, 2015, in the Korean Intellectual Property Office, the disclosure of which is incorporated by reference herein in its entirety.

TECHNICAL FIELD

Various embodiments relate to an electronic device and an operating method thereof.

BACKGROUND ART

With the technical advances, various functions are added to an electronic device. For example, the electronic device may receive power wirelessly. In this case, the electronic device may receive the power by using a magnetic field. In addition, the electronic device may perform short range communication. In this case, the electronic device may perform the short range communication by using the magnetic field. For this, the electronic device may include a plurality of modules and a plurality of coils. Herein, the modules may respectively correspond to the coils.

DISCLOSURE OF INVENTION

Technical Problem

However, a space for mounting coils is required in the aforementioned electronic device. In this case, the space for mounting the coils in the electronic device may be increased in proportion to the number of coils. In addition, a material cost for mounting the coils is required in the aforementioned electronic device. In this case, the material cost for mounting the coils in the electronic device may be increased in proportion to the number of coils. In addition, an interference may occur between modules through the coils in the electronic device. Accordingly, performance of the modules may deteriorate in the electronic device.

Solution to Problem

An electronic device according to various embodiments may include a first antenna, a first magnetic field module coupled to the first antenna and configured to perform first short range communication through the first antenna, and a second magnetic field module coupled to the first antenna and configured to receive power wirelessly through the first antenna.

A method of operating an electronic device according to various embodiments may include releasing a connection between a first antenna and a first magnetic field module, receiving power wirelessly through the first antenna by a second magnetic field module coupled to the first antenna, coupling the first antenna and the first magnetic field module, and performing first short range communication through the first antenna by the first magnetic field module.

Advantageous Effects of Invention

According to various embodiments, an electronic device may commonly use one coil in a plurality of magnetic field communication and charging schemes. Therefore, since a space for mounting the coil in the electronic device can be decreased, the electronic device can be implemented to have a compact size. In addition, a material cost for mounting the coil in the electronic device can be decreased. Alternatively, the electronic device may be designed by increasing a width of a winding of the coil since the space for mounting the coil is ensured, thereby decreasing a resistance component of the coil in the electronic device. Accordingly, performance of the coil can be improved in the electronic device. In addition, the electronic device controls a connection between modules, thereby avoiding an interference between the modules. That is, the modules can be separated from each other in the electronic device. Accordingly, performance of the modules can be improved in the electronic device.

BEST MODE FOR CARRYING OUT THE INVENTION

Figure 1:
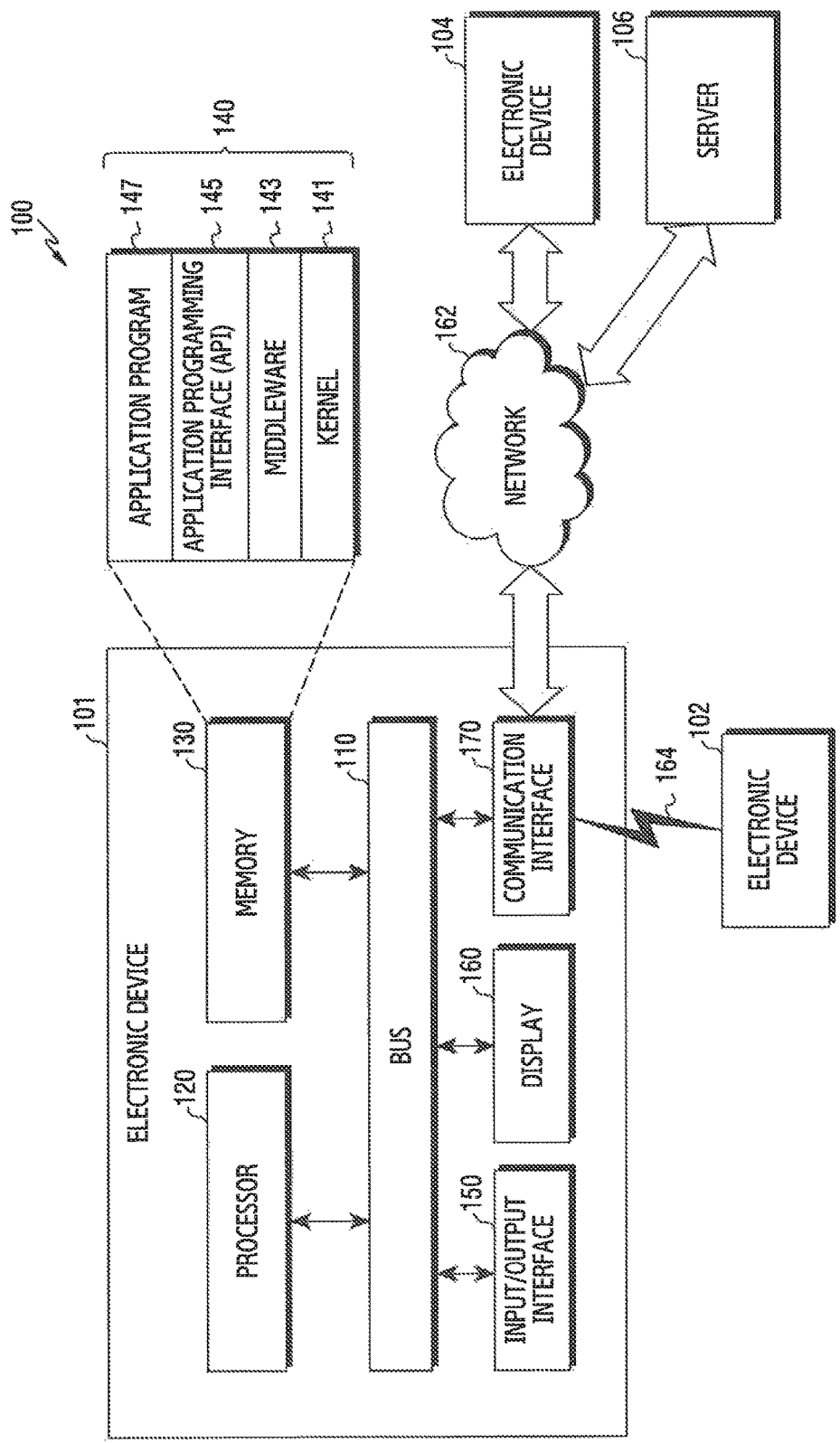
FIG. 1 illustrates a block diagram of a network environment system according to various embodiments.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.). According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 is a block diagram of a network environment system according to an embodiment of the present disclosure.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element. The bus 110 may, for example, include a circuit coupling the constituent elements 110, 120, 150, 160 and 170 with one another and forwarding communication (e.g., a control message or data) between the constituent elements. The processor 120 may include one or more of a central processing unit (CPU), an application processor (AP) or a communication processor (CP). The processor 120 may, for example, execute operation or data processing for control and/or communication of at least one another constituent element of the electronic device 101.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS). The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests. The API 145 is, for example, an interface enabling the application program 147 to control a function provided by the kernel 141 or the middleware 143 and may, for example, include at least one interface or function (e.g., an instruction) for file control, window control, image processing, character control or the like. The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body. The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106).

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like. The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106). According to an embodiment, in case where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

Figure 2:
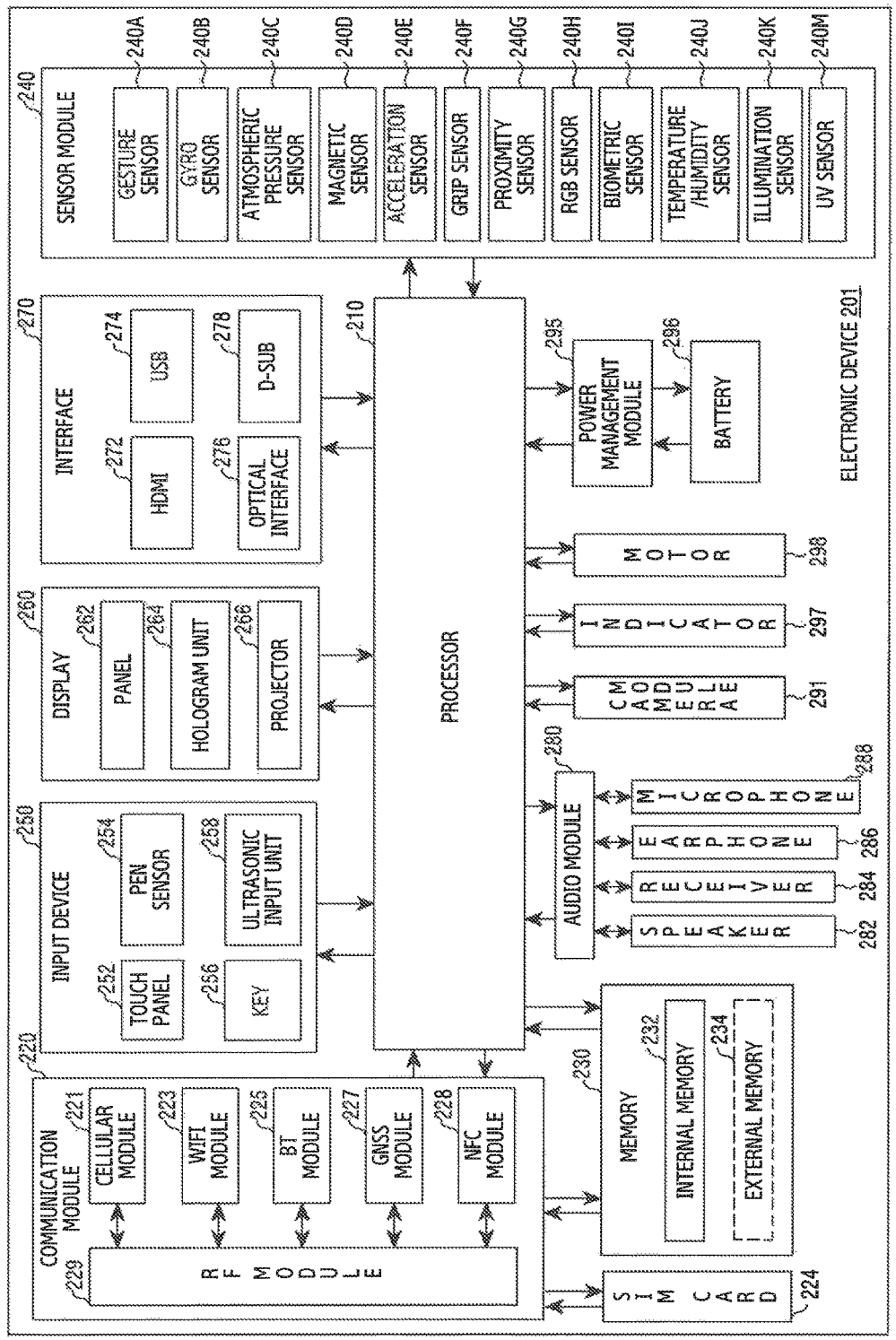
FIG. 2 illustrates a block diagram of an electronic device according to various embodiments.

FIG. 2 is a block diagram of an electronic device according to an embodiment of the present disclosure. Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

The communication module 220 may, for example, have the same or similar construction with the communication interface 170. The communication module 220 may, for example, include a cellular module 221, a WiFi module 223, a Bluetooth module 225, a GNSS module 227, an near field communication (NFC) module 228, and a radio frequency (RF) module 229. The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP). According to some embodiment, at least some (e.g., two or more) of the cellular module 221, the WiFi module 223, the Bluetooth module 225, the GNSS module 227 or the NFC module 228 may be included within one integrated chip (IC) or IC package. The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module. The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a medical sensor 240I, a temperature/humidity sensor 240J, an illuminance sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, and/or a control circuit for controlling them. The panel 262 may, for example, be implemented to be flexible, transparent, or wearable. The panel 262 may be constructed as one or more modules together with the touch panel 252. The hologram device 264 may show a three-dimensional image to the air using an interference of light. The projector 266 may project light onto a screen, to display an image. The screen may, for example, be located inside or outside the electronic device 201. The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like. The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like). The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like. Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
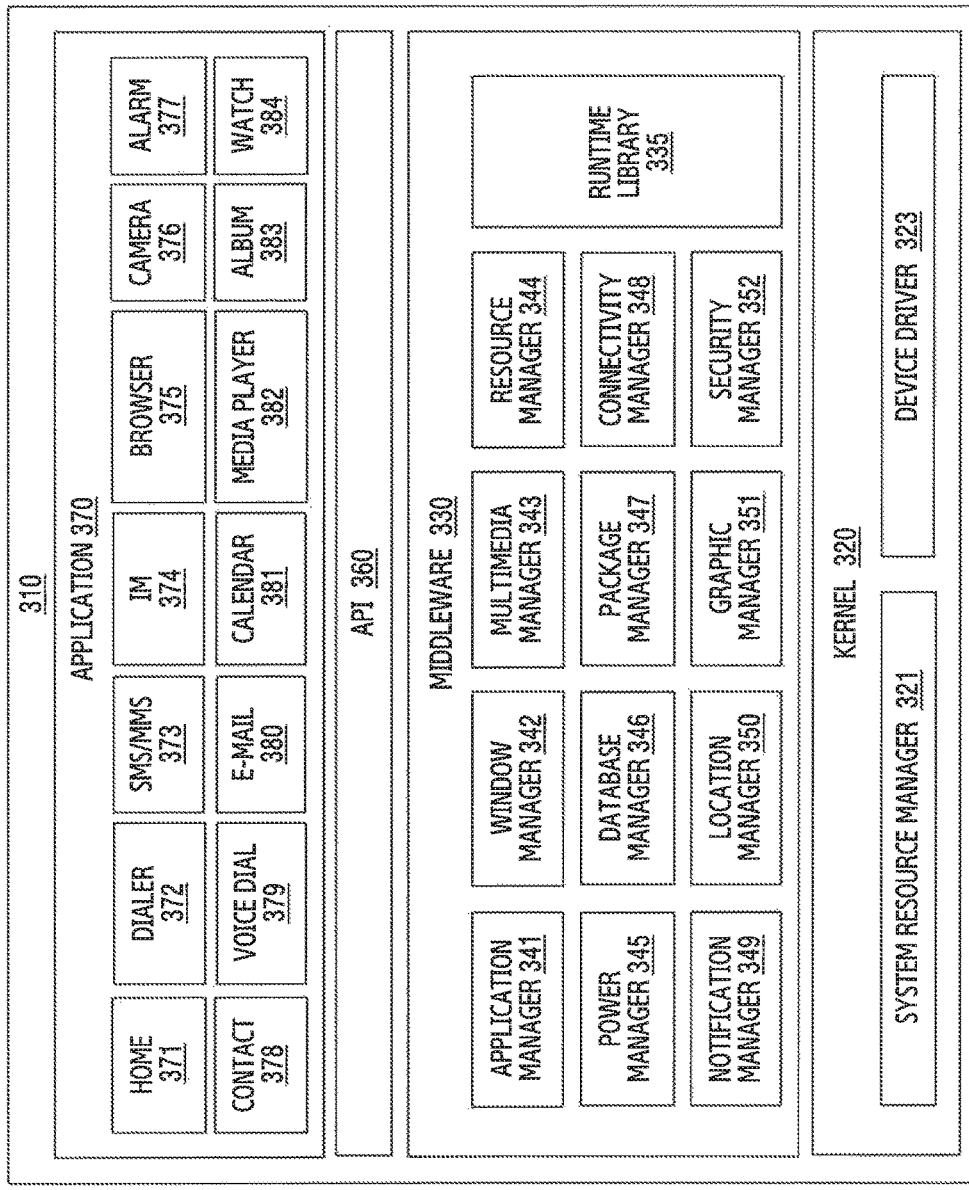
FIG. 3 illustrates a block diagram of a program module according to various embodiments.

FIG. 3 is a block diagram of a program module according to an embodiment of the present disclosure. Referring to FIG. 3, a program module 310 (e.g., the program 140) may include an Operating System (OS) for controlling resources related to an electronic device (e.g., the electronic device 101) and/or various applications (e.g., the application program 147) driven on the operating system. The operating system may, for example, include Android™, iOS™, Windows™, Symbian™, Tizen™ or Bada™. Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloaded from an external electronic device (e.g., the electronic device 102, 104, the server 106, etc.).

The kernel 320 may, for example, include a system resource manager 321 and/or a device driver 323. The system resource manager 321 may perform control of a system resource, allocation thereof, recovery thereof or the like. According to an embodiment, the system resource manager 321 may include a process management unit, a memory management unit or a file system management unit. The device driver 323 may, for example, include a display driver, a camera driver, a Bluetooth driver, a shared memory driver, a USB driver, a keypad driver, a WiFi driver, an audio driver or an inter-process communication (IPC) driver. The middleware 330 may, for example, provide a function that the application 370 commonly needs, or provide various functions to the application 370 through the API 360 so that the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 or a security manager 352.

The runtime library 335 may, for example, include a library module that a compiler uses to add a new function through a programming language while the application 370 is executed. The runtime library 335 may perform input output management, memory management or arithmetic function processing. The application manager 341 may, for example, manage a lifecycle of the application 370. The window manager 342 may manage a graphic user interface (GUI) resource used by a screen. The multimedia manager 343 may detect a format required for playing media files, and perform encoding or decoding of the media file by using a codec suitable to the corresponding format. The resource manager 344 may manage a source code of the application 370 or a space of a memory. The power manager 345 may, for example, manage a battery capacity or a power supply, and provide power information required for an operation of an electronic device. According to an embodiment, the power manager 345 may interwork with a basic input/output system (BIOS). The database manager 346 may, for example, create, search or change a database that will be used by the application 370. The package manager 347 may manage installation or updating of an application that is distributed in a form of a package file.

The connectivity manager 348 may, for example, manage wireless connectivity. The notification manager 349 may, for example, provide events such as an arrival message, an appointment, a proximity notification, etc. to a user. The location manager 350 may, for example, manage location information of an electronic device. The graphic manager 351 may, for example, manage a graphic effect that will be provided to a user, or a user interface related with this. The security manager 352 may, for example, provide system security or user authentication. According to an embodiment, the middleware 330 may include a telephony manager for managing a voice or video telephony function of an electronic device, or a middleware module capable of forming a combination of functions of the aforementioned constituent elements. According to an embodiment, the middleware 330 may provide a module that is specialized based on the type of an operating system. The middleware 330 may dynamically delete some of the existing constituent elements or add new constituent elements. The API 360 is, for example, a set of API programming functions, and may be provided to have another construction in accordance with the operating system. For example, Android or iOS may provide one API set by platform, and Tizen may provide two or more API sets by platform.

The application 370 may, for example, include a home 371, a dialer 372, a short message service (SMS)/multimedia messaging service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a momentum, a blood sugar or the like), or an environment information (e.g., air pressure, humidity or temperature information) provision application. According to an embodiment, the application 370 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay notification information generated by another application of an electronic device to an external electronic device, or receive notification information from the external electronic device to provide the received notification information to a user. The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device. According to an embodiment, the application 370 may include an application (e.g., a health care application of a mobile medical instrument) designated according to an attribute of the external electronic device. According to an embodiment, the application 370 may include an application received from the external electronic device. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

Figure 4:
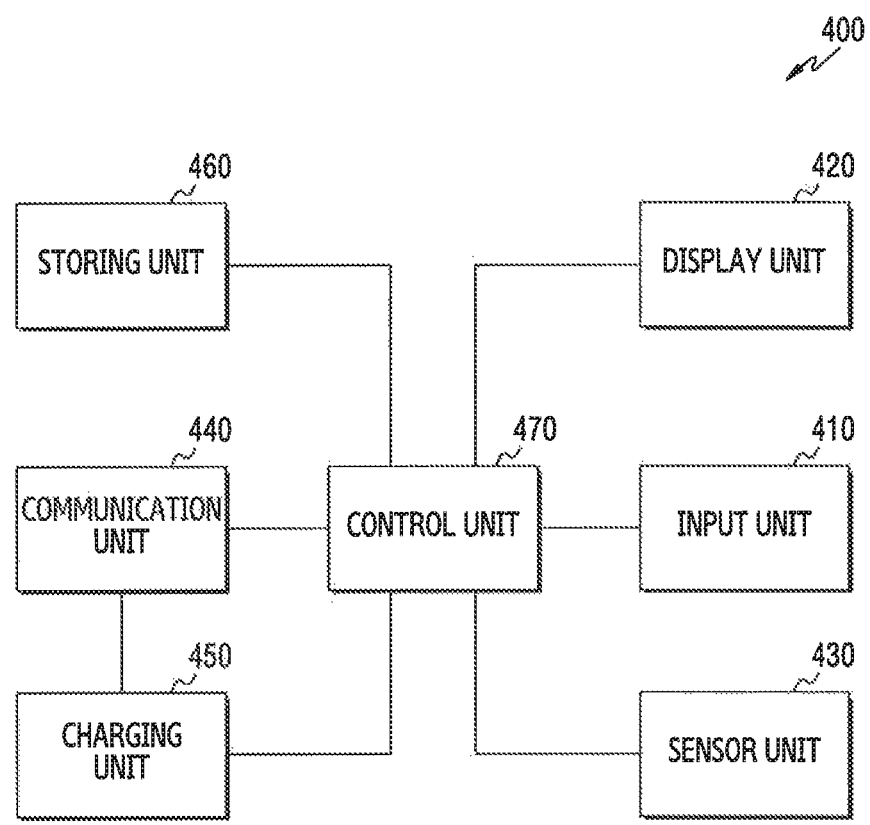
FIG. 4 illustrates a block diagram of an electronic device according to various embodiments.

FIG. 4 is a block diagram of an electronic device 400 according to various embodiments.

Referring to FIG. 4, the electronic device 400 according to various embodiments may include an input unit 410, a display unit 420, a sensor unit 430, a communication unit 440, a charging unit 450, a storing unit 460, and a control unit 470.

The input unit 410 may generate input data in the electronic device 400. In this case, the input unit 410 may generate the input data in response to a user input of the electronic device 400. In addition, the input unit 410 may include at least one input means. The input unit 410 may include a key pad, a dome switch, a physical button, a touch panel, and a jog & shuttle.

The display unit 420 may output display data in the electronic device 400. In this case, the display unit 420 may be implemented as a touch screen by being coupled to the input unit 410. For example, the display unit 420 may include a Liquid Crystal Display (LCD), a Light Emitting Diode (LED) display, an Organic Light-Emitting Diode (OLED) display, a Micro Electro Mechanical System (MEMS) display, and an electronic paper display.

The sensor unit 430 may detect at least any one of a status of the electronic device 400 and a peripheral status of the electronic device 400. The sensor unit 430 may include at least one sensor. According to various embodiments, the sensor unit 430 may include a fingerprint sensor to detect a fingerprint of a user of the electronic device 400. In this case, the fingerprint sensor may be coupled to the input unit 410 of the electronic device 400. For example, the fingerprint sensor 141 may include an optical fingerprint sensor which captures the fingerprint of the user of the electronic device 400 as an image, an ultrasonic fingerprint sensor, a capacitive fingerprint sensor, a semiconductor-type fingerprint sensor which detects electric conductivity, and a heart rate sensor.

The communication unit 440 may perform communication in the electronic device 400. In this case, the communication unit 440 may communicate with an external device (not shown) by using various communication schemes. Herein, the communication unit 440 may perform communication in a wired or wireless manner. In addition, the external electronic device may include, for example, an electronic device, a base station, a server, and a satellite.

For example, communication schemes may include at least any one of a cellular communication scheme, a short range communication scheme, and a wireless charging scheme. The cellular communication scheme may include, for example, a Long Term Evolution (LTE) scheme, a Wideband Code Division Multiple Access (WCDMA) scheme, and a Global System for Mobile communications (GSM) scheme. The short range communication scheme may include, for example, a Wireless Fidelity (WiFi) scheme, a wireless Local Area Network (LNA) scheme, a Bluetooth scheme, a Near Field Communications (NFC) scheme, and a Magnetic Secure Transmission (MST) scheme. The wireless charging scheme may include, for example, a magnetic resonance scheme, an electromagnetic induction scheme, and a Radio Frequency (RF)/micro wave radiation scheme.

The charging unit 450 may store power in the electronic device 400. In addition, the charging unit 450 may supply the power to drive the electronic device 400. For this, the charging unit 450 may perform charging and discharging repetitively.

The storing unit 460 may store operating programs of the electronic device 400. According to various embodiments, the storing unit 460 may store programs for performing communication by using various communication schemes. In addition, the storing unit 460 may store data generated during the programs are executed.

The control unit 470 may provide an overall control to the electronic device 400. In this case, the control unit 470 may perform various functions. For this, the control unit 470 may control components of the electronic device 400. In addition, the control unit 470 may receive and process a command or data from the components of the electronic device 400.

Figure 5A:
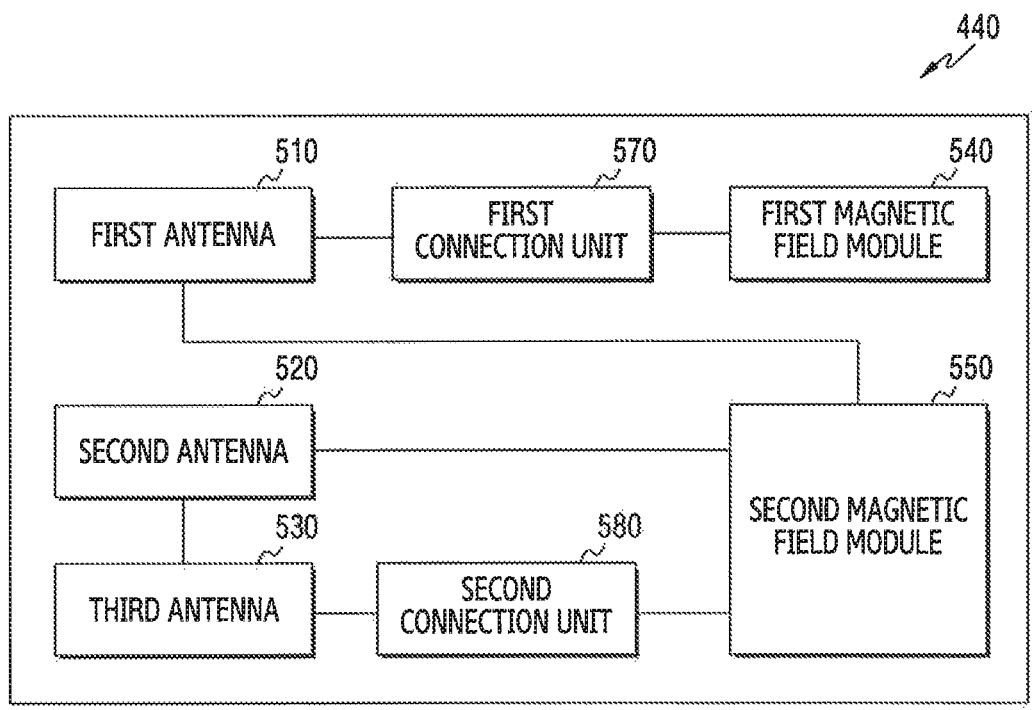
FIG. 5A and FIG. 5B illustrate block diagrams of a communication unit of FIG. 4.
Figure 5B:
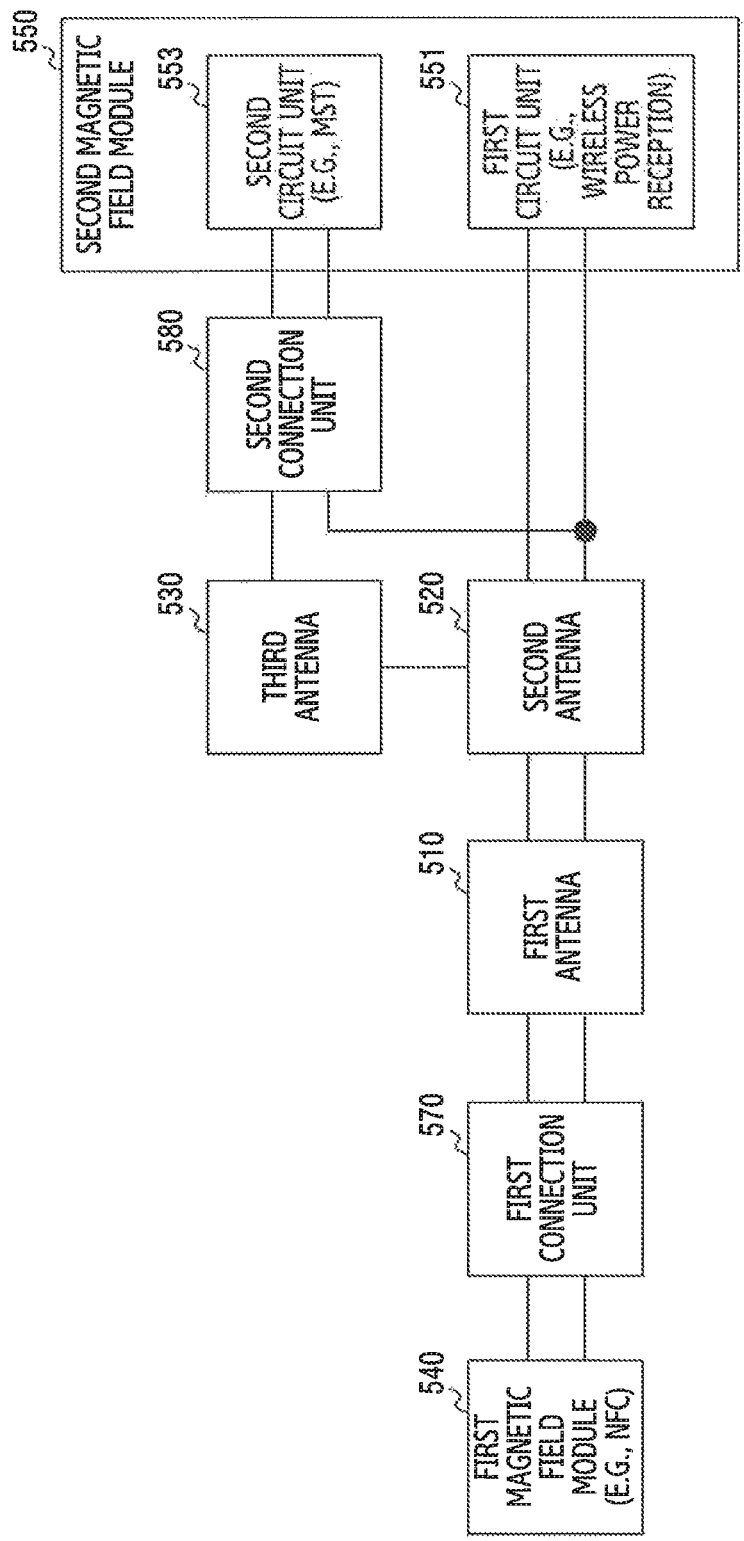

FIG. 5A and FIG. 5B illustrate block diagrams of a magnetic field communication and charging unit of the communication unit 440 in the electronic device 400 according to various embodiments.

Referring to FIG. 5A and FIG. 5B, in the electronic device 400 according to various embodiments, the magnetic field communication and charging unit of the communication unit 440 may include a first antenna 510, a second antenna 520, a third antenna 530, a first magnetic field module 540, a second magnetic field module 550, a first connection unit 570, and a second connection unit 580.

The first antenna 510 may be driven in response to a high frequency band $f_1$. According to various embodiments, the first antenna 510 may be commonly used based on a plurality of magnetic field schemes. For this, the high frequency band $f_1$ may support a first short range communication scheme and a first charging scheme. According to an embodiment, the first short range communication scheme may be an NFC scheme, and the first charging scheme may be a magnetic resonance scheme. For this, the high frequency band $f_1$ may include a first high frequency band $f_{11}$ for the magnetic resonance scheme and a second high frequency band $f_{12}$ for the NFC. Herein, at least part of the first high frequency band $f_{11}$ and at least part of the second high frequency band $f_{12}$ may overlap with each other in a frequency domain, and the first high frequency band $f_{11}$ and the second high frequency band $f_{12}$ may be separated from each other in the frequency domain. The second high frequency band $f_{12}$ may correspond to a multiplication of the first frequency band $f_{11}$ (i.e., $n \times f_{11}$).

The second antenna 520 may be driven independently. In this case, the second antenna 520 may be driven in response to a first low frequency band $f_{21}$. In addition, the second antenna 520 and the third antenna 530 may be coupled to be driven together. In this case, the second antenna 520 and the third antenna 530 may be driven in response to a second low frequency band $f_{22}$. According to various embodiments, the second antenna 520 may be commonly used based on a plurality of magnetic field communication and charging schemes. For this, the first low frequency band $f_{21}$ may support a second charging scheme, and the second low frequency band $f_{22}$ may support a second short range communication scheme. According to an embodiment, the second charging scheme may be an electromagnetic induction scheme, and the second short range communication scheme may be an MST scheme. Herein, at least part of the first low frequency band $f_{21}$ and at least part of the second low frequency band $f_{22}$ may overlap with each other in the frequency domain, and the first low frequency band $f_{21}$ and the second low frequency band $f_{22}$ may be separated from each other in the frequency domain.

The first magnetic field module 540 may perform communication by using the first antenna 510. According to various embodiments, the first magnetic field module 540 may use the first antenna 510 according to the first short range communication scheme. Accordingly, the first magnetic field module 540 may perform first short range communication through the first antenna 510. In this case, the first magnetic field module 540 may perform first short range communication through the high frequency band $f_1$. According to an embodiment, the first short range communication scheme may be an NFC scheme. For example, the first magnetic field module 540 may perform the NFC through the second high frequency band $f_{12}$.

The second magnetic field module 550 may perform communication by using at least any one of the first antenna 510, the second antenna 520, and the third antenna 530.

According to various embodiments, the second magnetic field module 550 may receive power wirelessly by using any one of the first antenna 510 and the second antenna 520. According to various embodiments, the second magnetic field module 550 may perform second short range communication by using the third antenna 530.

According to various embodiments, the second magnetic field module may use the first antenna 510 on the basis of the first charging scheme, and may use the second antenna 520 on the basis of the second charging scheme. Accordingly, the second magnetic field module 550 may receive power through the first antenna 510 by using the first charging scheme, and may receive power through the second antenna 520 by using the second charging scheme. According to an embodiment, the first charging scheme may be a magnetic resonance scheme, and the second charging scheme may be an electromagnetic induction scheme. For example, the second magnetic field module 550 may receive power through the first high frequency band $f_{11}$ by using the magnetic resonance scheme, and may receive power through the first low frequency band $f_{21}$ by using the electromagnetic induction scheme.

According to various embodiments, the second magnetic field module 550 may use the second antenna 520 and the third antenna 530 on the basis of the second short range communication scheme. Accordingly, the second magnetic field module 550 may perform second short range communication through the second antenna 520 and the third antenna 530. According to an embodiment, the second short range communication scheme may be a Magnetic Secure Transmission (MST) scheme. For example, the second magnetic field module 550 may perform MST through the second frequency band $f_{22}$. An MST technique is a communication technique for an offline payment using a magnetic field, and may be used to perform communication with a Point of Sale (POS) device.

According to an embodiment, the second magnetic field module 550 may include a first circuit unit 551 and a second circuit unit 553. The first circuit unit 551 may receive power through the first antenna 510 by using the first charging scheme, and may receive power through the second antenna 520 by using the second charging scheme. The second circuit unit 553 may perform second short range communication through the second antenna 520 and the third antenna 530.

The first connection unit 570 may control a connection between the first antenna 510 and the first magnetic field module 540. For this, the first connection unit 570 may be disposed between the first antenna 510 and the first magnetic field module 540. In this case, the first connection unit 570 may operate under the control of the control unit 470. According to various embodiments, the first connection unit 570 may operate based on driving of the first magnetic field module 540. For example, when the first magnetic field module 540 is not driven, the first connection unit 570 may release the connection between the first antenna 510 and the first magnetic field module 540. Meanwhile, when the first magnetic field module 540 is driven, the first connection unit 570 may couple the first antenna 510 and the first magnetic field module 540. Accordingly, when the first magnetic field module 540 is not driven, the first connection unit 570 may separate the first magnetic field module 540 to protect it.

The second connection unit 580 may control a connection between the second antenna 520, the third antenna 530, and the second magnetic field module 550. For this, the second connection unit may be disposed between the second antenna 520 and the second magnetic field module 550 and between the third antenna 530 and the second magnetic field module 550. In this case, the second connection unit 580 may operate under the control of the controller 470. According to various embodiments, the second connection unit 580 may operate based on driving of the second magnetic field module 550. For example, when the second magnetic field module 550 is not driven, the second connection unit 580 may release the connection between the third antenna 530 and the second magnetic field module 550. Meanwhile, when the second magnetic field module 550 is driven, the second connection unit 580 may couple the third antenna 530 and the second magnetic field module 550. Accordingly, when the second magnetic field module 550 is not driven, the second connection unit 580 may separate the second magnetic field module 550 to protect it.

Figure 6:
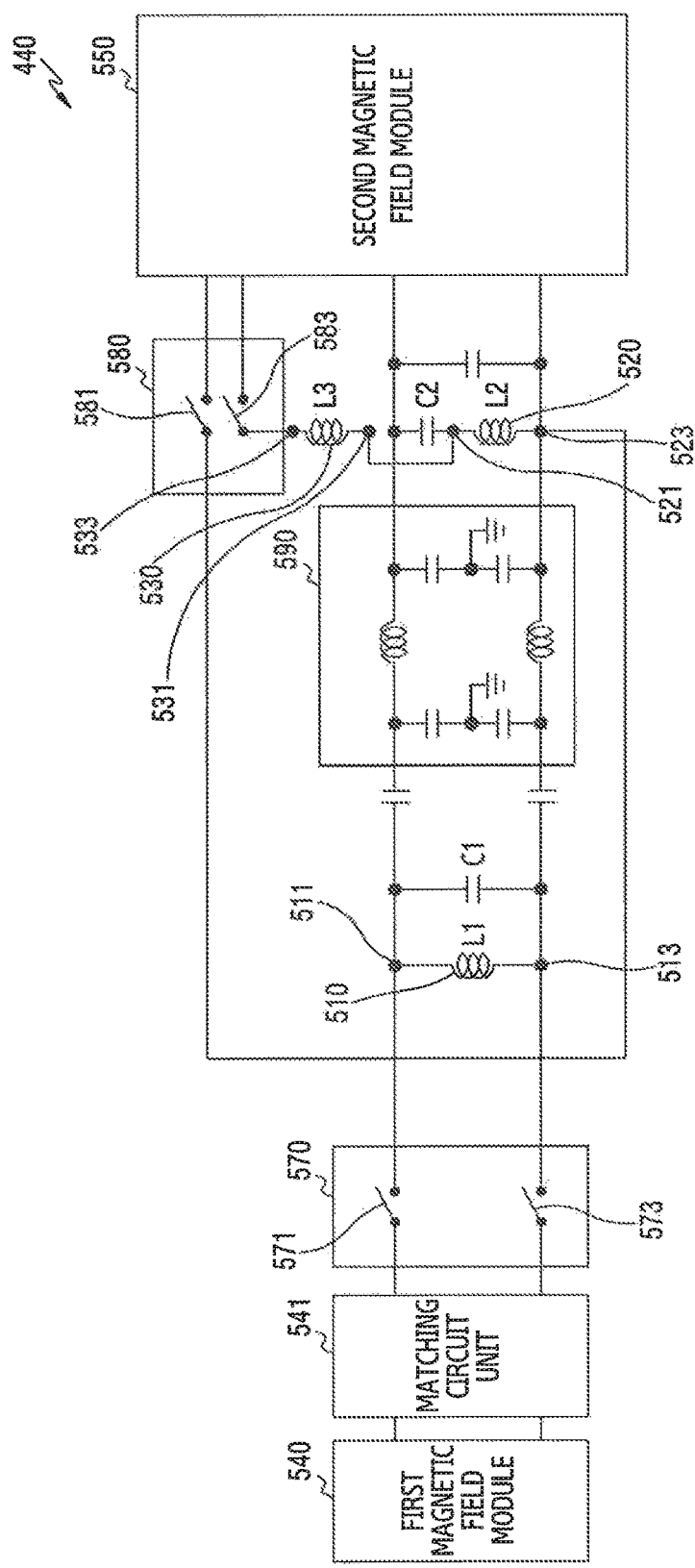
FIG. 6 illustrates a circuit diagram of a communication unit of FIG. 4.
Figure 7:
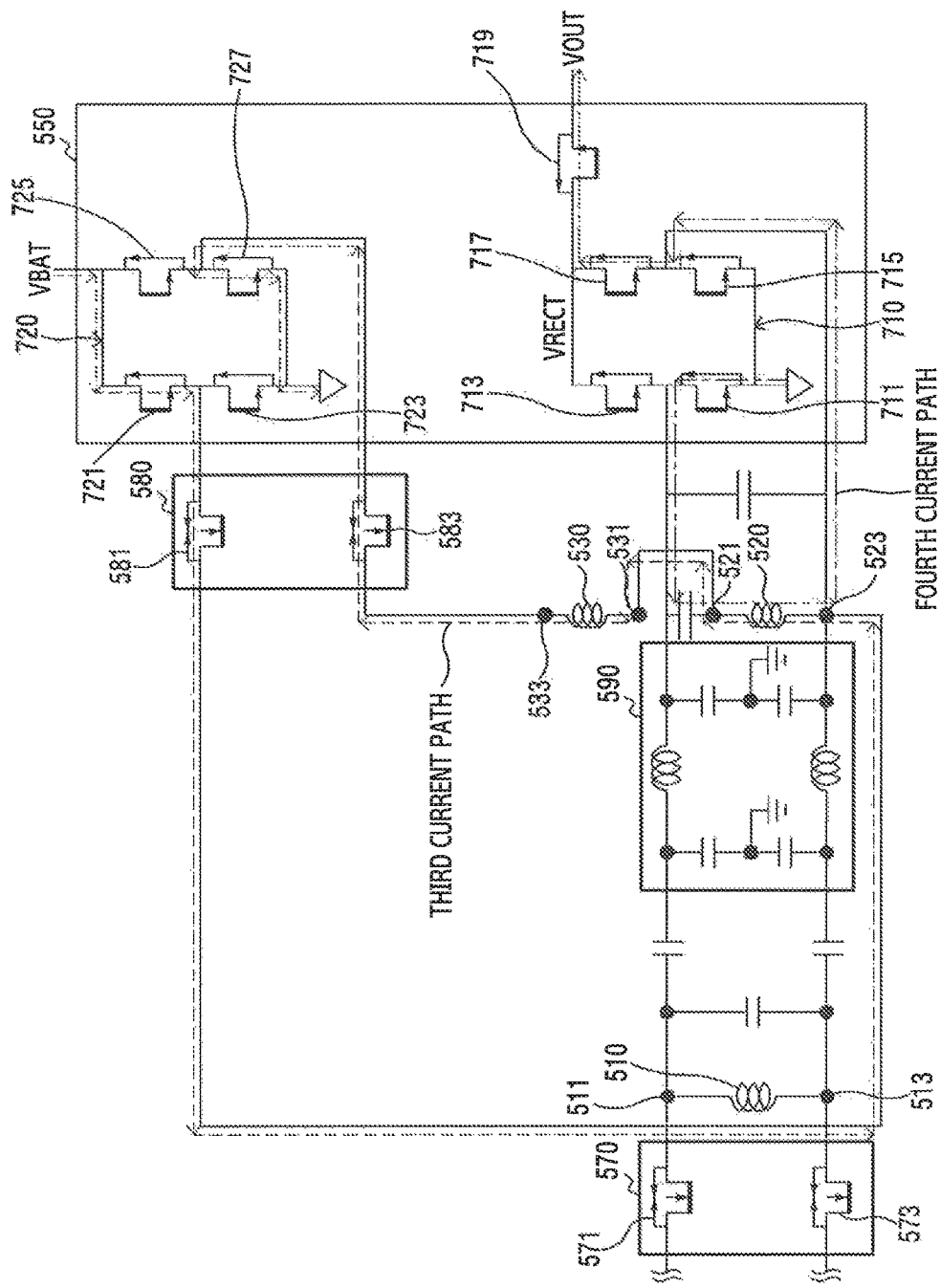
FIG. 7, FIG. 8, and FIG. 9 illustrate circuit diagrams of a second magnetic field module of FIG. 6.
Figure 8:
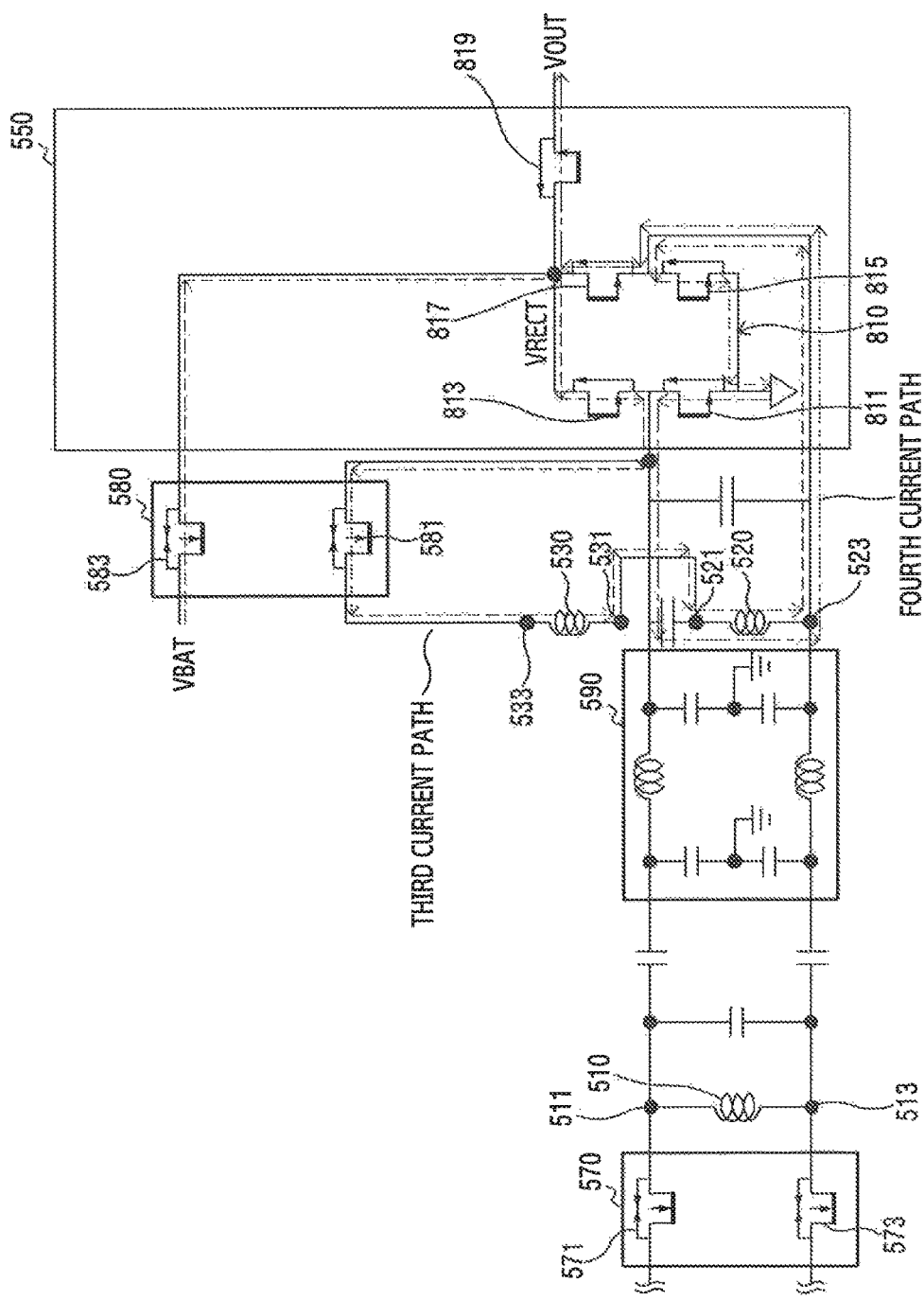
Figure 9:
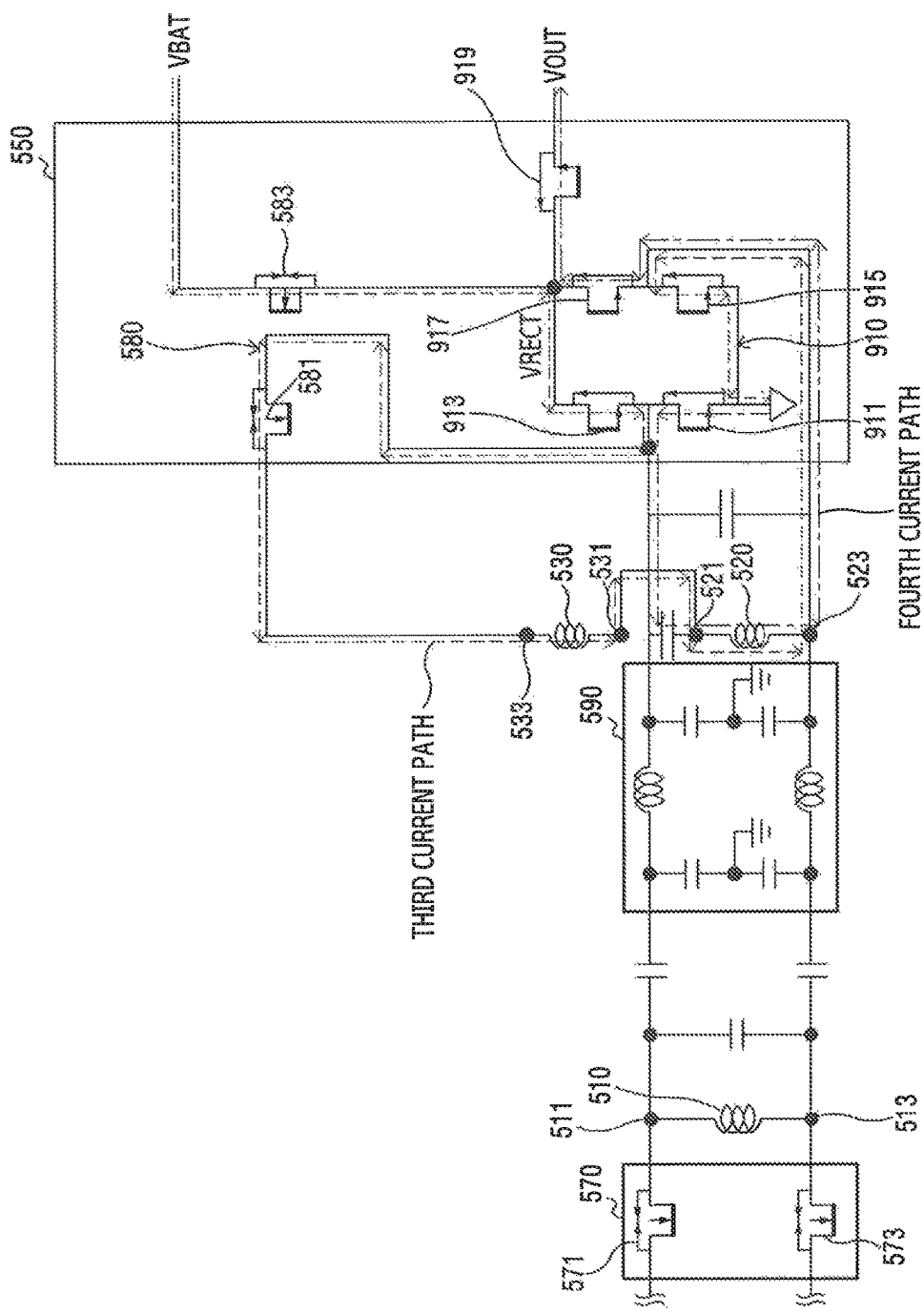

FIG. 6 illustrates a circuit diagram of a magnetic field communication and charging unit of the communication unit 440 in the electronic device 400 according to various embodiments. In addition, FIG. 7, FIG. 8, and FIG. 9 illustrate circuit diagrams of the second magnetic field module 550 of FIG. 6.

Referring to FIG. 6, in the electronic device 400 according to various embodiments, the magnetic field communication and charging unit of the communication unit 440 may include a first antenna 510, a second antenna 520, a third antenna 530, a first magnetic field module 540, a second magnetic field module 550, a first connection unit 570, and a second connection unit 580.

The first antenna 510 may be coupled to the first magnetic field module 540 and the second magnetic field module 550. For this, the first antenna 510 may include a first terminal 511 and a second terminal 513. That is, the first terminal 511 and the second terminal 513 may be disposed at both end portions in the first antenna 510. In addition, the first terminal 511 may be coupled to the first magnetic field module 540 and the second magnetic field module 550, and the second terminal 513 may be coupled to the first magnetic field module 540 and the second magnetic field module 550. Herein, the first terminal 511 and the second terminal 513 may not be directly coupled to the first magnetic field module 540, but may be coupled to the first magnetic field module 540 through the first connection unit 570. In other words, the first terminal 511 and the second terminal 513 may be coupled to the first connection unit 570 and the second magnetic field module 550. For example, the first antenna 510 may be represented by a first inductor L1.

According to an embodiment, the first antenna 510 may be represented by a first capacitor C1 together with the first inductor L. For example, the first capacitor C1 may be coupled in parallel to the first inductor L1, between the first antenna 510 and the second magnetic field module 550. The first capacitor C1 may be provided for frequency matching between the first antenna 510 and the second magnetic field module 550. For example, capacitance of the first capacitor C1 may be determined according to inductance of the first inductor L1 and the first high frequency band $f_{11}$ as shown in Equation (1) below.

$$C1 = \frac{1}{(2\pi f_{11})^2 \cdot L1} \qquad (1)$$

The second antenna 520 may be coupled to the second magnetic field module 550. For this, the second antenna 520 may include a first terminal 521 and a second terminal 523. That is, the first terminal 521 and the second terminal 523 may be disposed at both end portions of the second antenna 520. In addition, the first terminal 521 and the second terminal 523 may be coupled to the second magnetic field module 550. Further, the second antenna 520 may be coupled in parallel to the first antenna 510. For example, the second antenna 520 may be represented by a second inductor L2.

According to an embodiment, the second antenna 520 may be represented by a second capacitor C2 together with the second inductor L2. For example, the second capacitor C2 may be coupled in series to the second inductor L2, between the second antenna 520 and the second magnetic field module 550. The second capacitor C2 may be provided for frequency matching between the second antenna 520 and the second magnetic field module 550. For example, capacitance of the second capacitor C2 may be determined according to inductance of the second inductor L2 and the first low frequency band $f_{21}$ as shown in Equation (2) below.

$$C2 = \frac{1}{(2\pi f_{21})^2 \cdot L2} \quad (2)$$

The third antenna 530 may be coupled to the second magnetic field module 550. In addition, the third antenna 530 may be coupled to the second antenna 520. For this, the third antenna 530 may include a connecting terminal 531 and a third terminal 533. That is, the connecting terminal 531 and the third terminal 533 may be disposed at both end portions of the third antenna 530. In addition, the connecting terminal 531 may be coupled to the second antenna 520, and the third terminal 533 may be coupled to the second magnetic field module 550. Herein, the third terminal 533 may not be directly coupled to the second magnetic field module 550, but may be coupled to the second magnetic field module 550 through the second connection unit 580. Further, the third antenna 530 may be coupled in parallel to the first antenna 510, and may be coupled in series to the second antenna 520. For example, the third antenna 530 may be represented by a third inductor L3.

The first magnetic field module 540 may be coupled to the first antenna 510. In this case, the first magnetic field module 540 may be coupled to the first terminal 511 and second terminal 513 of the first antenna 510. Herein, the first magnetic field module 540 may not be directly coupled to the first terminal 511 and the second terminal 513, but may be coupled to the first terminal 511 and the second terminal 513 through the first connection unit 507. Accordingly, the first magnetic field module 540 may perform NFC through the second high frequency band $f_{12}$ on the basis of the inductance of the first inductor L1.

According to an embodiment, the first magnetic field module 540 may include a matching circuit unit 541. For example, the matching circuit unit 541 may be disposed inside the first magnetic field module 540, and thus the first magnetic field module 540 and the matching circuit unit 541 may be constructed integrally. Alternatively, the matching circuit unit 541 may be disposed outside the first magnetic field module 540, and thus the first magnetic field module 540 and the matching circuit unit 541 may be constructed independently from each other. The matching circuit unit 541 may be disposed between the first antenna 510 and the first magnetic field module 540. For example, the matching circuit unit 541 may be disposed between the first connection unit 570 and the first magnetic field module 540. The matching circuit unit 541 may be provided for frequency matching between the first antenna 510 and the first magnetic field module 540. For example, capacitance of the matching circuit unit 541 may be determined according to the inductance of the first inductor L1 and the capacitance of the first capacitor C1.

The second magnetic field module 550 may be coupled to the first antenna 510, the second antenna 520, and the third antenna 530. In this case, the second magnetic field module 550 may be coupled to the first terminal 511 and second terminal 513 of the first antenna 510. Accordingly, the second magnetic field module 550 may receive power through the first frequency band $f_{11}$ by using the magnetic resonance scheme on the basis of a combination of the inductance of the first inductor L1 and the capacitance of the first capacitor C1. In addition, the second magnetic field module 550 may be coupled to the first terminal 521 and second terminal 523 of the second antenna 520. Accordingly, the second magnetic field module 550 may receive power by using the electromagnetic induction scheme through the first frequency band $f_{21}$ on the basis of the inductance of the second inductor L2 and the capacitance of the second capacitor C2. Further, the second magnetic field module 550 may be coupled to the second terminal 523 of the second antenna 520 and the third terminal 533 of the third antenna 530. Accordingly, the second magnetic field module 550 may perform MST through the second low frequency band $f_{22}$ on the basis of a combination of the inductance of the second inductor L2 and the inductance of the third inductor L3.

The first connection unit 570 may be coupled to the first antenna 510 and the first magnetic field module 540. In this case, the first connection unit 570 may include one or more switches 571 and 573, for example, the input switch 571 and the output switch 573. The input switch 571 may be disposed between the first terminal 511 of the first antenna 510 and the first magnetic field module 540. The output switch 573 may be disposed between the second terminal 513 of the first antenna 510 and the first magnetic field module 540. Accordingly, when the first antenna 510 and the first magnetic field module 540 are coupled by means of the first connection unit 570, a first current path may be provided along the first magnetic field module 540, the input switch 571, the first terminal 511 of the first antenna 510, the first antenna 510, the second terminal 513 of the first antenna 510, the output switch 573, and the first magnetic field module 540. On the other hand, when the connection of the first antenna 510 and the first magnetic field module 540 is released by means of the first connection unit 570, a second current path may be provided along the second magnetic field module 550, the first terminal 511 of the first antenna 510, the first antenna 510, the second terminal 513 of the first antenna 510, and the second magnetic field module 550.

The second connection unit 580 may be coupled to the third antenna 530 and the second magnetic field module 550. In this case, the second connection unit 580 may include one or more switches 581 and 583, for example, the first connection switch 581 and the second connection switch 583. The first connection switch 581 may be disposed between the first terminal 521 of the second antenna 520 and the second magnetic field module 550. The second connection switch 583 may be disposed between the third antenna 530 and the second magnetic field module 550. Accordingly, when the third antenna 530 and the second magnetic field module 550 are coupled by means of the second connection unit 580, a third current path may be provided along the second magnetic field module 550, the second terminal 523 of the second antenna 520, the second antenna 520, the connecting portion 531 of the third antenna 530, the third antenna 530, the third terminal 533 of the third antenna 530, and the second magnetic field module 550. On the other hand, when the connection between the third antenna 530 and the second magnetic field module 550 is released by means of the second connection unit 580, a fourth current path may be provided along the second magnetic field module 550, the first terminal 521 of the second antenna 520, the second antenna 520, the second terminal 523 of the second antenna 520, and the second magnetic field module 550.

According to an embodiment, the communication unit 440 may further include a noise reducing filter 590. The noise reducing filter 590 may be disposed between the first magnetic field module 540 and the second magnetic field module 550. The noise reducing filter 590 may suppress a noise input from the first magnetic field module 540 to the second magnetic field module 550, in response to driving of the first magnetic field module 540. In addition, the noise reducing filter 590 may suppress a noise input from the second magnetic field module 550 to the first magnetic field module 540, in response to driving of the second magnetic field module 550.

According to an embodiment, as shown in FIG. 7, the second magnetic field module 550 may include a first circuit unit 710 and a second circuit unit 720.

The first circuit unit 710 may be coupled to the first antenna 510 and the second antenna 520. In this case, the first circuit unit 710 may be coupled to the first terminal 511 and second terminal 513 of the first antenna 510 and a first terminal 521 and second terminal 523 of the second antenna 520. Accordingly, the first circuit unit 710 may receive power through the first frequency band $f_{11}$ by using the magnetic resonance scheme on the basis of a combination of the inductance of the first inductor L1 and the capacitance of the first capacitor C1. In addition, the first circuit unit 710 may receive power by using the electromagnetic induction scheme through the first frequency band $f_{21}$ on the basis of the inductance of the second inductor L2 and the capacitance of the second capacitor C2.

For example, the first circuit unit 710 may include an inverter. The first circuit unit 710 may include a first switch 711, second switch 713, third switch 715, and fourth switch 717 arranged in a bridge form and a status switch 719. The first switch 711 and the third switch 715 may be commonly grounded. The second switch 713 and the fourth switch 717 may be coupled to the status switch 719. The first switch 711 and the second switch 713 may be coupled in series, and the third switch 715 and the fourth switch 717 may be coupled in series. The first and second switches 711 and 713 and the third and fourth switches 715 and 717 may be coupled in parallel to each other.

Between the first switch 711 and the second switch 713, the first terminal 511 of the first antenna 510 may be coupled, and the first terminal 521 of the second antenna 520 may be coupled through the second capacitor C2. Between the third switch 715 and the fourth switch 717, the second terminal 513 of the first antenna 510 may be coupled, and the second terminal 523 of the second antenna 520 may be coupled. The status switch 719 may be coupled to the fourth switch 717 and the charging unit 450. Accordingly, a second current path may be provided along the first terminal 511, the first antenna 510, the second terminal 513, the fourth switch 717, and the status switch 719. Meanwhile, a fourth current path may be provided along the first terminal 521, the second antenna 520, the second terminal 523, the fourth switch 717, and the status switch 719.

The second circuit unit 720 may be coupled to the second antenna 520 and the third antenna 530 through the second connection unit 580. For example, the second circuit unit 720 may be coupled to the first terminal 521 of the second antenna 520 through the first connection switch 581, and may be coupled to the third terminal 533 of the third antenna 530 through the second connection switch 583. Accordingly, the second circuit unit 720 may perform MST through the second low frequency band $f_{22}$ on the basis of a combination of the inductance of the second inductor L2 and the inductance of the third inductor L3.

For example, the second circuit unit 720 may include an inverter. The second circuit unit 720 may include a first switch 721, second switch 723, third switch 725, and fourth switch 727 which are arranged in a bridge form. The first switch 721 and the third switch 725 may be coupled to the charging unit 450 or the control unit 470. A source of the second switch 723 and a source of the fourth switch 727 may be commonly grounded. The first switch 721 and the second switch 723 may be coupled in series, and the third switch 725 and the fourth switch 727 may be coupled in series. The first and second switches 721 and 723 and the third and fourth switches 725 and 727 may be coupled in parallel to each other.

Between the first switch 721 and the second switch 723, the first terminal 521 of the second antenna 520 may be coupled through the first connection switch 581 of the second connection unit 580. Between the third switch 725 and the fourth switch 727, the third terminal 533 of the third antenna 530 may be coupled through the second connection switch 583 of the second connection unit 580. Accordingly, a third current path may be provided along the charging unit 450 or the control unit 470, the first switch 721, the first connection switch 581, the second terminal 523, the second antenna 510, the connecting terminal 531, the third antenna 530, the third terminal 533, the second connection switch 583, and the fourth switch 717.

According to another embodiment, as shown in FIG. 8, the second magnetic field module 550 may include an integrated circuit unit 810.

The integrated circuit unit 810 may be coupled to the first antenna 510 and the second antenna 520. In this case, the integrated circuit unit 810 may be coupled to the first terminal 511 and second terminal 513 of the first antenna 510 and the first terminal 521 and second terminal 523 of the second antenna 520. Accordingly, the integrated circuit unit 810 may receive power through the first frequency band $f_{11}$ by using the magnetic resonance scheme on the basis of a combination of the inductance of the first inductor L1 and the capacitance of the first capacitor C1. In addition, the integrated circuit unit 810 may receive power by using the electromagnetic induction scheme through the first frequency band $f_{21}$ on the basis of the inductance of the second inductor L2 and the capacitance of the second capacitor C2.

In addition, the integrated circuit unit 810 may be coupled to the third antenna 530 through the second connection unit 580. For example, the integrated circuit unit 810 may be coupled to the third terminal 533 of the third antenna 530 through the first connection switch 581. Accordingly, the integrated circuit unit 810 may perform MST through the second low frequency band $f_{22}$ on the basis of a combination of the inductance of the second inductor L2 and the inductance of the third inductor L3.

For example, the integrated circuit unit 810 may include an inverter. The integrated circuit unit 810 may include a first switch 811, second switch 813, third switch 815, and fourth switch 817 arranged in a bridge form and a status switch 819. The first switch 811 and the third switch 815 may be commonly grounded. The first switch 811 and the second switch 813 may be coupled in series, and the third switch 815 and the fourth switch 817 may be coupled in series. The first and second switches 811 and 813 and the third and fourth switches 815 and 817 may be coupled in parallel to each other.

Between the first switch 811 and the second switch 813, the first terminal 511 of the first antenna 510 may be coupled, and the first terminal 521 of the second antenna 520 may be coupled through the second capacitor C2. Between the third switch 815 and the fourth switch 817, the second terminal 513 of the first antenna 510 may be coupled, and the second terminal 523 of the second antenna 520 may be coupled. The second switch 813 and the fourth switch 817 may be coupled to the status switch 819. The status switch 819 may be coupled between the second and fourth switches 813 and 817 and the charging unit 450. Accordingly, a second current path may be provided along the first terminal 511, the first antenna 510, the second terminal 513, the fourth switch 817, and the status switch 819. Meanwhile, a fourth current path may be provided along the first terminal 521, the second antenna 520, the second terminal 523, the fourth switch 817, and the status switch 819.

Between the first switch 821 and the second switch 823, the third terminal 533 of the third antenna 530 may be coupled through the first connection switch 581 of the second connection unit 580. Between the third switch 815 and the fourth switch 817, the second terminal 523 of the second antenna 520 may be coupled. The second switch 813 and the fourth switch 817 may be coupled to the charging unit 450 or the control unit 470 through the second connection switch 583 of the second connection unit 580. Accordingly, a third current path may be provided along the charging unit 450 or the control unit 470, the second connection switch 583, the second switch 823, the first connection switch 581, the third terminal 533, the third antenna 530, the connecting terminal 531, the second antenna 510, the second terminal 523, and the third switch 815.

According to another embodiment, as shown in FIG. 9, the second magnetic field module 550 may include the second connection unit 580 and an integrated circuit unit 910. That is, the second connection unit 580 may be embedded in the second magnetic field module 550, and thus the second magnetic field module 550 and the second connection unit 580 may be constructed integrally. In this case, the second connection unit 580 may include the first connection switch 581 and the second connection switch 583.

The integrated circuit unit 910 may be coupled to the first antenna 510 and the second antenna 520. In this case, the integrated circuit unit 910 may be coupled to the first terminal 511 and second terminal 513 of the first antenna 510 and the first terminal 521 and second terminal 523 of the second antenna 520. Accordingly, the integrated circuit unit 910 may receive power through the first frequency band $f_{11}$ by using the magnetic resonance scheme on the basis of a combination of the inductance of the first inductor L1 and the capacitance of the first capacitor C1. In addition, the integrated circuit unit 910 may receive power by using the electromagnetic induction scheme through the first frequency band $f_{21}$ on the basis of the inductance of the second inductor L2 and the capacitance of the second capacitor C2.

In addition, the integrated circuit unit 910 may be coupled to the third antenna 530 through the second connection unit 580. For example, the integrated circuit unit 910 may be coupled to the third terminal 533 of the third antenna 530 through the first connection switch 581. Accordingly, the integrated circuit unit 910 may perform MST through the second low frequency band $f_{22}$ on the basis of a combination of the inductance of the second inductor L2 and the inductance of the third inductor L3.

For example, the integrated circuit unit 910 may include an inverter. The integrated circuit unit 910 may include a first switch 911, second switch 913, third switch 915, and fourth switch 917 arranged in a bridge form and a status switch 919. The first switch 911 and the third switch 915 may be commonly grounded. The first switch 911 and the second switch 913 may be coupled in series, and the third switch 915 and the fourth switch 917 may be coupled in series. The first and second switches 911 and 913 and the third and fourth switches 915 and 917 may be coupled in parallel to each other.

Between the first switch 911 and the second switch 913, the first terminal 511 of the first antenna 510 may be coupled, and the first terminal 521 of the second antenna 520 may be coupled through the second capacitor C2. Between the third switch 915 and the fourth switch 917, the second terminal 513 of the first antenna 510 may be coupled, and the second terminal 523 of the second antenna 520 may be coupled. The second switch 913 and the fourth switch 917 may be coupled to the status switch 919. The status switch 919 may be coupled between the second and fourth switches 913 and 917 and the charging unit 450. Accordingly, a second current path may be provided along the first terminal 511, the first antenna 510, the second terminal 513, the fourth switch 917, and the status switch 919. Meanwhile, a fourth current path may be provided along the first terminal 521, the second antenna 520, the second terminal 523, the fourth switch 917, and the status switch 919.

Between the first switch 921 and the second switch 923, the third terminal 533 of the third antenna 530 may be coupled through the first connection switch 581 of the second connection unit 580. Between the third switch 915 and the fourth switch 917, the second terminal 523 of the second antenna 520 may be coupled. The second switch 913 and the fourth switch 917 may be coupled to the charging unit 450 or the control unit 470 through the second connection switch 583 of the second connection unit 580. Accordingly, a third current path may be provided along the charging unit 450 or the control unit 470, the second connection switch 583, the second switch 923, the first connection switch 581, the third terminal 533, the third antenna 530, the connecting terminal 531, the second antenna 510, the second terminal 523, and the third switch 915.

Figure 10A:
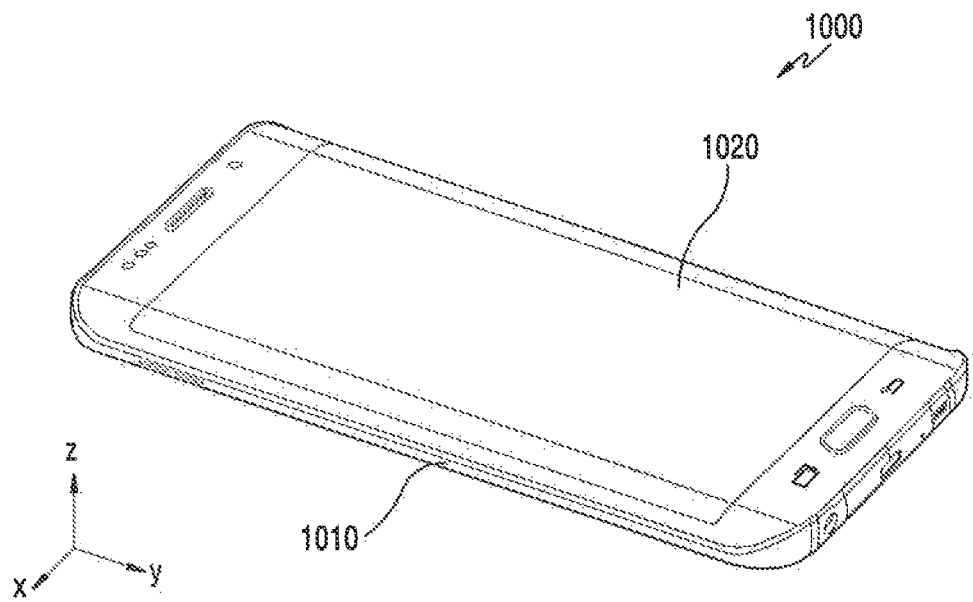
FIG. 10 illustrates perspective views of an electronic device according to various embodiments.
Figure 10B:
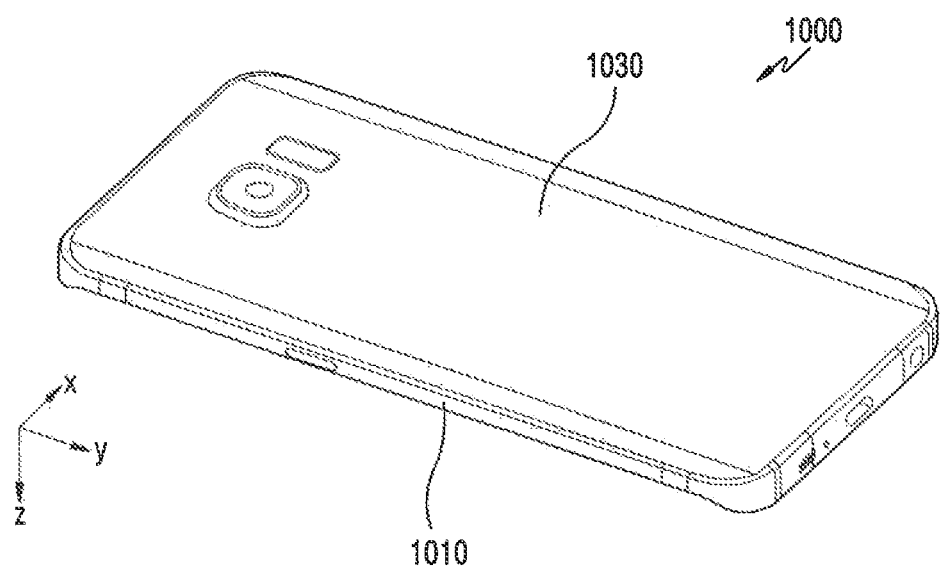
Figure 11:
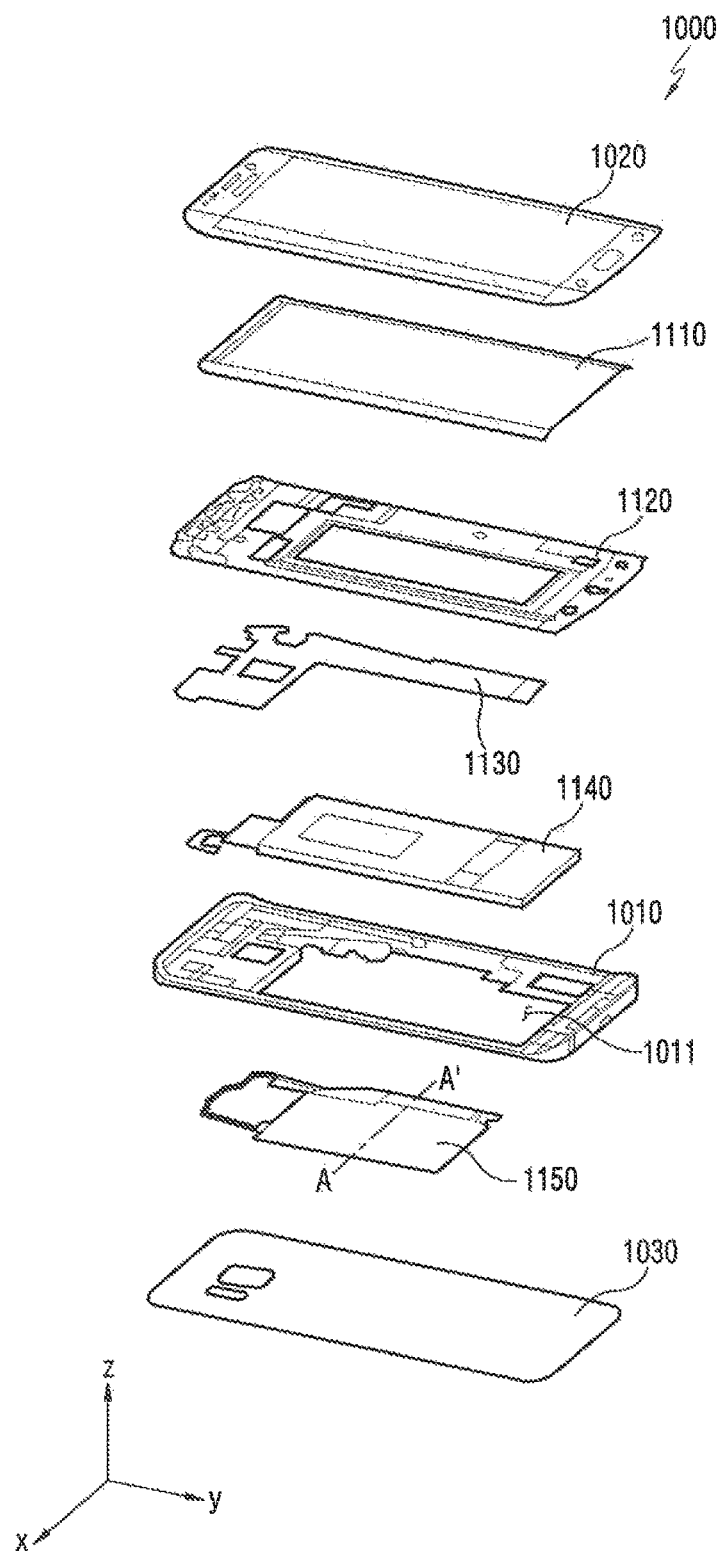
FIG. 11 illustrates an exploded view of an electronic device of FIG. 10.

FIG. 10 illustrate perspective views of an electronic device 1000 according to various embodiments. FIG. 11 illustrates an exploded view of the electronic device 1000 according to various embodiments. In this case, the electronic device 1000 according to various embodiments may include at least part of the electronic device 400 of FIG. 4.

Referring to FIG. 10 and FIG. 11, the electronic device 1000 according to various embodiments may include a housing 1010, a front cover 1020, and a rear cover 1030. The electronic device 1000 may be provided in a structure in which the housing 1010, the front cover 1020, and the rear cover 1030 are joined. That is, the front cover 1020 may be joined to an upper side of the housing 1010, and the rear cover 1030 may be joined to a lower side of the housing 1010. In addition, a space may be provided between the housing 1010 and the front cover 1020 and between the housing 1010 and the rear cover 1030. The front cover 1020 and the rear cover 1030 may be joined to each other in respective edge regions, and may be joined in a boundary region of the housing 1010. In this case, an accommodation groove 1011 may be disposed to an inner region of the housing 1010. Further, the front cover 1020 may be constructed of a transparent material.

In addition, the electronic device 1000 may include an interface module 1110, a support member 1120, a driving board 1130, a battery pack 1140, and an antenna module 1150. The interface module 1110, the driving board 1130, the battery pack 1140, and the antenna module 1150 may be electrically coupled. That is, the driving board 1130 may be coupled to each of the interface module 1110, the battery pack 1140, and the antenna module 1150.

The interface module 1110, the support member 1120, the driving board 1130, and the battery pack 1140 may be mounted between the housing 1010 and the front cover 1020. The interface module 1110 may be disposed by facing the front cover 1020. According to an embodiment, the interface module 1110 may include the display unit 420 of FIG. 4. According to another embodiment, the interface module 1110 may include the input unit 410 and display unit 420 of FIG. 4. In addition, the interface module 1110 may be mounted to an upper side of the support member 1120. The support member 1120 may fix and support the interface module 1110. The driving board 1130 may be mounted to a lower side of the support member 1120. According to an embodiment, the driving board 1130 may include a portion of the communication unit 440 of FIG. 4 and may include the storage unit 460 and the control unit 470. For example, the driving board 1130 may include the first magnetic field module 540, second magnetic field module 550, first connection unit 570, and second connection unit 580 of FIG. 5. On the same plane as the driving board 1130, the battery pack 1140 may be disposed in parallel to one side of the driving board 1130. Alternatively, the battery pack 1140 may be disposed to a lower side of the driving board 1130. At least part of the battery pack 1140 may be inserted to the accommodation groove 1011 of the housing 1010. According to an embodiment, the battery pack 1140 may include the charging unit 450 of FIG. 4.

The antenna module 1150 may be mounted between the housing 1010 and the rear cover 1030. For example, the antenna module 1150 may be attached to the driving board 1130. According to an embodiment, the antenna module 1150 may include a portion of the communication unit 440 of FIG. 4. For example, the antenna module 1150 may include the first antenna 510, second antenna 520, and third antenna 530 of FIG. 5.

Figure 12:
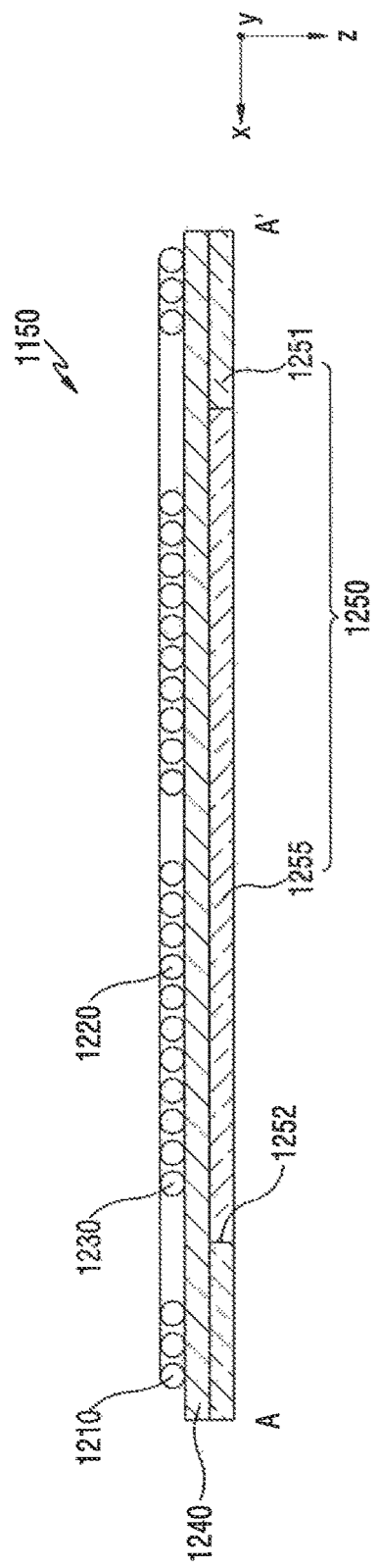
FIG. 12 illustrates a cross-sectional view cut along the line A-A' of an antenna module of FIG. 10.
Figure 13:
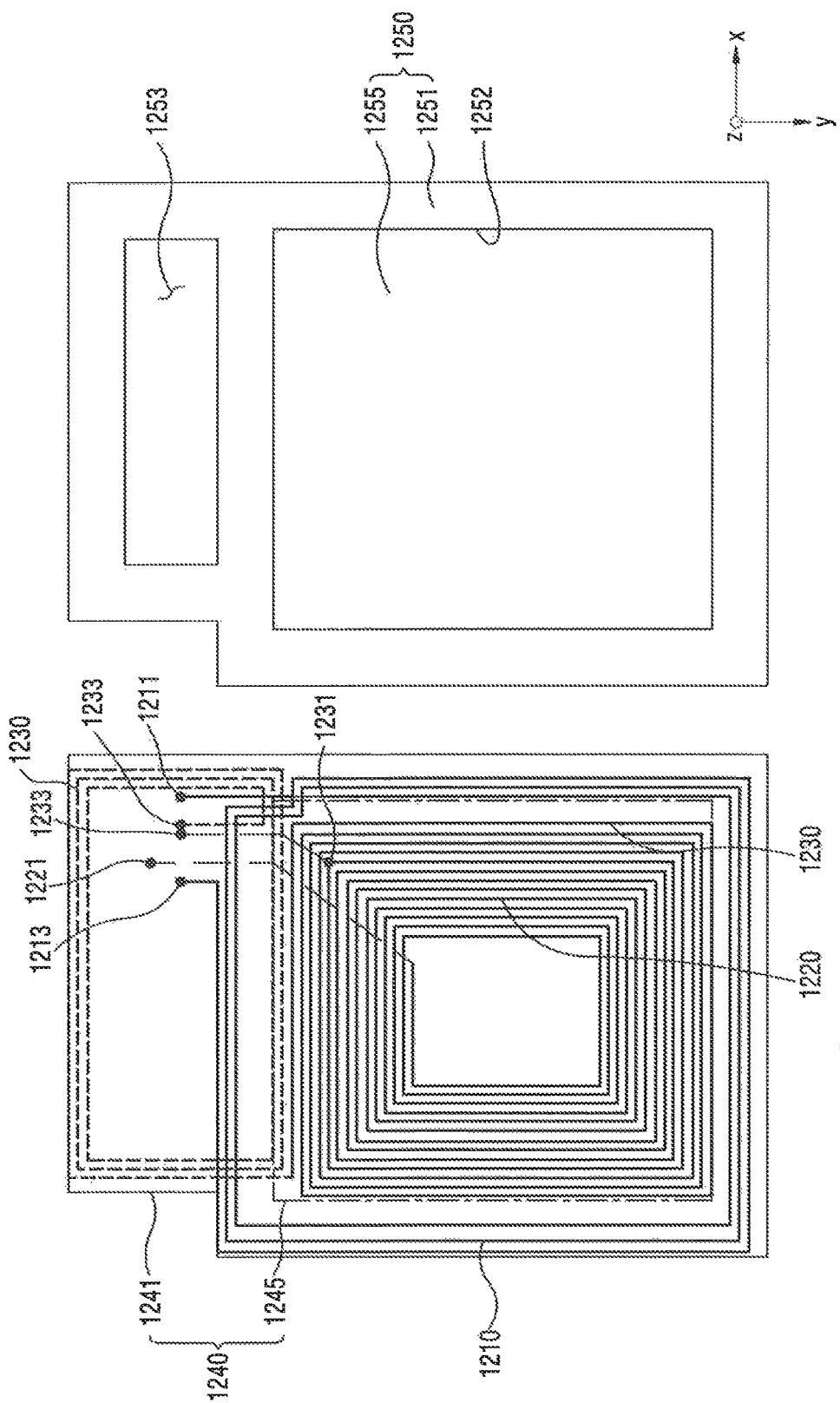
FIG. 13 illustrates plan views of an example of an antenna module of FIG. 10.
Figure 14:
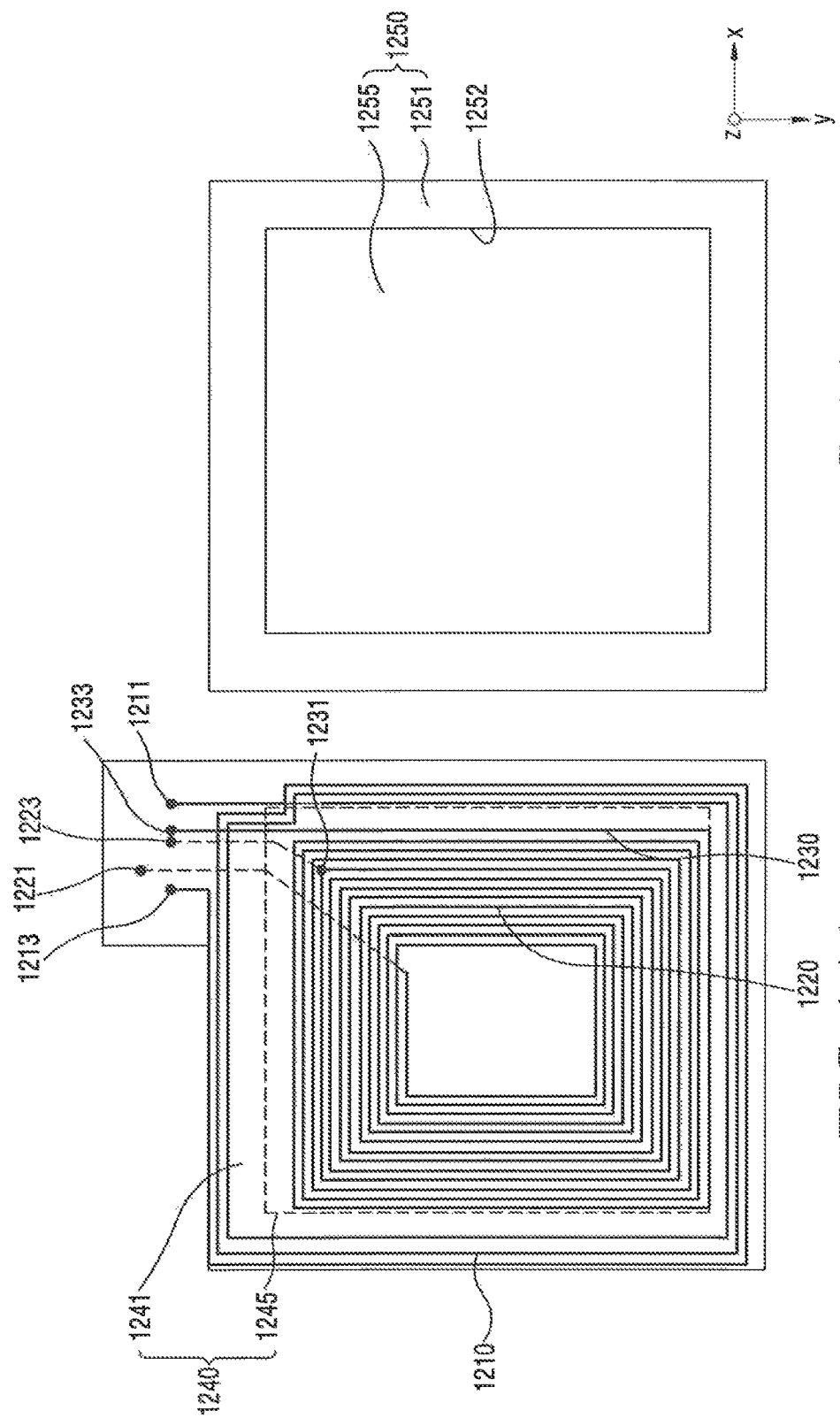
FIG. 14 illustrates plan views of another example of an antenna module of FIG. 10.

FIG. 12 illustrates a cross-sectional view cut along the line A-A' of an antenna module in an electronic device according to various embodiments. Further, FIG. 13 illustrates plan views of an example of an antenna module in an electronic device according to various embodiments. Furthermore, FIG. 14 illustrates plan views of another example of an antenna module in an electronic device according to various embodiments.

Referring to FIG. 12, in the electronic device 1000 according to various embodiments, the antenna module 1150 may include a first coil 1210, a second coil 1220, a third coil 1230, a mounting member 1240, and a shielding member 1250.

The first coil 1210 may be driven in response to the high frequency band $f_1$. The first coil 1210 may be coupled to the driving board 1130. For this, the first coil 1210 may include a first terminal 1211 and a second terminal 1213. That is, the first terminal 1211 and the second terminal 1213 may be disposed to both end portions of the first coil 1210. In addition, the first terminal 1211 and the second terminal 1213 may be coupled to the driving board 1130. According to various embodiments, the first coil 1210 may correspond to the first antenna 510 of FIG. 5 and FIG. 6. In this case, the first terminal 1211 and second terminal 1213 of the first coil 1210 may correspond to the first terminal 511 and second terminal 513 of the first antenna 510. Accordingly, the first terminal 1211 and second terminal 1213 of the first coil 1210 may be coupled to the first magnetic field module 540 and second magnetic field module 550 of the driving board 1130.

Accordingly, the first coil 1210 may be commonly used based on a plurality of magnetic field communication and charging schemes. For this, the high frequency band $f_1$ may support a first short range communication scheme and a first charging scheme. According to an embodiment, the first short range communication scheme may be an NFC scheme, and the first charging scheme may be a magnetic resonance scheme. For this, the high frequency band $f_1$ may include the first high frequency band $f_{11}$ for the magnetic resonance scheme and the second high frequency band $f_{12}$ for the NFC. For example, the first frequency band $f_{11}$ may correspond to about 6.78 MHz, and the second high frequency band $f_{12}$ may correspond to a multiplication of the first frequency band $f_{11}$, i.e., about 13.56 MHz.

For this, the first coil 1210 may be designed in response to the high frequency band $f_1$ as shown in Table 1 below. That is, the first coil 1210 may be designed according to the inductance of the first inductor L and the capacitance of the first capacitor C1 of FIG. 6. For example, the inductance of the first inductor L1 may correspond to about 1.30 μH to 1.65 μH. In this case, the inductance of the first inductor L1 may be determined according to a size, i.e., an electrical length and thickness, of the first coil 1210. Meanwhile, the capacitance of the first capacitor C1 may be calculated according to the inductance of the first inductor L and the first high frequency band $f_{11}$. In this case, the capacitance of the first capacitor C1 may be determined according to a partial interval in the first coil 1210.

The second coil 1220 may be driven independently. In this case, a second coil 1220 may be driven in response to the first low frequency band $f_{21}$. In addition, the second coil 1220 and the third coil 1230 may be connected to be driven together. In this case, the second coil 1220 and the third coil 1230 may be driven in response to the second low frequency band $f_{22}$. The second coil 1220 and the third coil 1230 may be coupled to the driving board 1130.

The second coil 1220 may include the first terminal 1221 and the second terminal 1223. That is, the first terminal 1221 and the second terminal 1223 may be disposed to both end portions of the second coil 1220. In addition, the first terminal 1221 and the second terminal 1223 may be coupled to the driving board 1130. According to various embodiments, the second coil 1220 may correspond to the second antenna 520 of FIG. 5 and FIG. 6. In this case, the first terminal 1221 and second terminal 1223 of the second coil 1220 may correspond to the first terminal 521 and second terminal 523 of the second antenna 520. Accordingly, the first terminal 1221 and second terminal 1223 of the second coil 1220 may be coupled to the second magnetic field module 550 of the driving board 1130.

The third coil 1230 may include a connecting terminal 1231 and a third terminal 1233. That is, the connecting terminal 1231 and the third terminal 1233 may be disposed to both end portions of the third coil 1230. In addition, the connecting terminal 1231 and the third terminal 1233 may be coupled to the driving board 1130. According to various embodiments, the third coil 1230 may correspond to the third antenna 530 of FIG. 4 and FIG. 6. In this case, the connecting terminal 1231 and third terminal 1233 of the third coil 1230 may correspond to the first terminal 531 and third terminal 533 of the third antenna 530. Accordingly, the connecting terminal 1231 of the third coil 1230 may be coupled to the second coil 1220, and the third terminal 533 of the third coil 1230 may be coupled to the second magnetic field module 550 of the driving board 1130.

Accordingly, the second coil 1220 may be commonly used based on a plurality of magnetic field communication and charging schemes. For this, the first low frequency band $f_{21}$ may support a second charging scheme, and the second low frequency band $f_{22}$ may support a second short range communication scheme. According to an embodiment, the second charging scheme may be an electromagnetic induction scheme, and the second short range communication scheme may be an MST scheme. For example, the first low frequency band $f_{21}$ may correspond to about 100 kHz to 200 kHz, and the second low frequency band may correspond to about below 10 kHz.

For this, the second coil 1220 may be designed in response to the low frequency band $f_{21}$ as shown in Table 1 below. That is, the second coil 1220 may be designed according to the inductance of the second inductor L2 and the capacitance of the second capacitor C2 of FIG. 6. For example, the inductance of the second inductor L2 may correspond to about 8.40 μH to 9.20 μH. In this case, the inductance of the second inductor L2 may be determined according to a size, i.e., an electrical length and thickness, of the second coil 1220. Meanwhile, the capacitance of the second capacitor C2 may be calculated according to the inductance of the second inductor L2 and the second low frequency band $f_{21}$. In this case, the capacitance of the second capacitor C2 may be determined according to a partial interval in the second coil 1220.

Meanwhile, the third coil 1230 may be designed in response to the second low frequency band $f_{22}$, together with the second coil 1220 as shown in Table 1 below. That is, the third coil 1230 may be designed according to the inductance of the third inductor L3 of FIG. 6. For example, a sum of the inductance of the second inductor L2 and the inductance of the third inductor L3 may correspond to about 15.70 μH to 18.00 μH. In this case, the inductance of the third inductor L3 may be determined according to a size, i.e., an electrical length and thickness, of the third coil 1230.

TABLE 1

| Magnetic field type | Coil design value | | |
| --- | --- | --- | --- |
| | Inductance | Resistance | Frequency Band |
| NFC type | 1.30 μH~1.65 μH | 0.24 Ω~0.40 Ω | 13.56 MHz |
| Magnetic resonance type | 1.30 μH~1.65 μH | 0.40 Ω~0.60 Ω | 6.78 MHz |
| Electromagnetic induction type | 8.40 μH~9.20 μH | 0.35 Ω~0.75 Ω | 100 kHZ~200 kHz |
| MST type | 15.70 μH~18.00 μH | 0.32 Ω~1.50 Ω | Below 10 kHz |

The mounting member 1240 may support the first coil 1210, the second coil 1220, and the third coil 1230. In this case, the mounting member 1240 may be constructed in a single-layer structure or a multi-layer structure. For example, the mounting member 1240 may include a Printed Circuit Board (PCB), a Flexible PCB (FPCB), and a film. According to an embodiment, the mounting member 1240 may be divided into an outer region 1241 corresponding to the first coil 1210 and an inner region 1245 corresponding to at least part of the second coil 1220 and the third coil 1230.

According to various embodiments, the first coil 1210, the second coil 1220, and the third coil 1230 may be disposed to the mounting member 1240 by facing the rear cover 1030. For example, as shown in FIG. 13 and FIG. 14, the first coil 1210, the second coil 1220, and the third coil 1230 may be disposed from the outside to the inside of the mounting member 1240. That is, the first coil 1210 may be disposed to an outermost side of the mounting member 1240, the third coil 1230 may be disposed to an inner side of the first coil 1210, and the second coil 1220 may be disposed to an inner side of the third coil 1230. According to an embodiment, the first coil 1210, the second coil 1220, and the third coil 1230 may be disposed to one side of the mounting member 1240. According to another embodiment, as indicated by a dotted line in FIG. 13 and FIG. 14, at least any one of the first coil 1210, the second coil 1220, and the third coil 1230 may be extended to the other side of the mounting member 1240 by penetrating the mounting member 1240.

The shielding member 1250 may separate the first coil 1210, the second coil 1220, and the third coil 1230. According to various embodiments, the shielding member 1250 may be disposed by facing the driving board 1130 and the battery pack 1140. Accordingly, the shielding member 1250 may separate the first coil 1210, the second coil 1220, and the third coil 1230 from other components of the electronic device 1000. In addition, as shown in FIG. 13 and FIG. 14, the shielding member 1250 may expose the first terminal 1211 and second terminal 1213 of the first coil 1210, the first terminal 1221 and second terminal 1223 of the second coil 1220, and the third terminal 1233 of the third coil 1230. According to an embodiment, the shielding member 1250 may include a first shielding member 1251 and a second shielding member 1255.

The first shielding member 1251 may separate the first coil 1210. For this, the first coil 1210 may be disposed on the first shielding member 1251. In addition, the first shielding member 1251 may shield the high frequency band $f_1$. That is, when the first coil 1210 operates, the first shielding member 1251 may block a magnetic field of the first coil 1210. According to an embodiment, the first shielding member 1251 may correspond to the outer region 1241 of the mounting member 1240. For this, an accommodating space 1252 may be provided in the first shielding member 1251. The accommodating space 1252 may penetrate the first shielding member 1251.

Accordingly, the first shielding member 1251 may surround the second shielding member 1255. For example, as shown in FIG. 13, an exposed space 1253 may be further provided in the first shielding member 1251. The exposed space 1253 may penetrate the first shielding member 1251. Accordingly, the first shielding member 1251 may expose the first terminal 1211 and second terminal 1213 of the first coil 1210, the first terminal 1221 and second terminal 1223 of the second coil 1220, and the third terminal 1233 of the third coil 1230 through the exposed space 1253.

The second shielding member 1255 may separate the second coil 1220 and the third coil 1230. For this, at least part of the second coil 1220 and the third coil 1230 may be disposed on the second shielding member 1255. In addition, the second shielding member 1255 may shield the first low frequency band $f_{21}$ and the second low frequency band $f_{22}$. That is, when the second coil 1220 operates or the second coil 1220 and the third coil 1230 operate, the second shielding member 1255 may block a magnetic field of the second coil 1220 or the second coil 1220 and the third coil 1230. According to an embodiment, the second shielding member 1255 may correspond to the inner region 1245 of the mounting member 1240. For this, the second shielding member 1255 may be inserted to the accommodating space 1252 of the first shielding member 1251.

According to various embodiments, the first shielding member 1251 and the second shielding member 1255 may have a different material property. Herein, the first shielding member 1251 and the second shielding member 1255 may have a different permeability μ. For example, the permeability of the first shielding member 1251 may be 150, 230, or 250, and the permeability of the second shielding member 1255 may be 700. In addition, the permeability of the first shielding member 1251 may be maintained in the high frequency band $f_1$. Accordingly, a loss rate of the first shielding member 1251 may be suppressed in the high frequency band $f_1$. In addition, permeability of the second shielding member 1255 may be maintained in the first low frequency band $f_{21}$ and the second low frequency band $f_{22}$. Accordingly, a loss rate of the second shielding member 1255 may be suppressed in the first low frequency band $f_{21}$ and the second low frequency band $f_{22}$.

The first shielding member 1251 and the second shielding member 1255 may be constructed of various shielding materials. For example, the shielding material may include any one of polymer, amorphous, and ferrite. That is, the first shielding member 1251 and the second shielding member 1255 may include metal powders and a resin material. Herein, the metal powders may include soft magnetic metal powders such as aluminum (Al), metal silicon, iron oxide (FeO; Fe3O4; Fe2O3), and the like. In addition, the resin material may include a thermoplastic resin such as polyolefin elastomer. In this case, metal powders of the first shielding member 1251 and metal powders of the second shielding member 1255 may be constructed of different types. Alternatively, the metal powders of the first shielding member 1251 and the metal powders of the second shielding member 1255 may be constructed of the same type. However, a weight ratio of the metal powders in the first shielding member 1251 may be different from a weight ratio of the metal powders in the second shielding member 1255. Alternatively, a mixing ratio of the metal powders in the first shielding member 1251 may be different from a maxing ratio of the metal powders in the second shielding member 1255.

The electronic devices 400 and 1000 according to various embodiments may include the first antenna 510, the first magnetic field module 540 coupled to the first antenna 510 and configured to perform first short range communication through the first antenna 510, and the second magnetic field module 550 coupled to the first antenna 510 and configured to receive power wirelessly through the first antenna 510.

The electronic devices 400 and 1000 according to various embodiments may further include the first connecting unit 570 configured to control a connection between the first antenna 510 and the first magnetic field module 540, based on driving of the first magnetic field module 540.

According to various embodiments, when the first antenna 519 and the first magnetic field module 540 are coupled, a first current path may be provided along the first antenna 510 and the first magnetic field module 540, and when the connection of first antenna 510 and the first magnetic field module 540 is released, a second current path may be provided along the first antenna 510 and the second magnetic field module 550.

The electronic devices 400 and 1000 according to various embodiments may further include the second antenna 520 coupled to the second magnetic field module 550.

According to various embodiments, the second magnetic field module 550 may be configured to receive power through the first antenna 510 by using a first charging scheme, and receive power through the second antenna 520 by using a second charging scheme.

The electronic devices 400 and 1000 according to various embodiments may further include the third antenna 530 extended from the second antenna 520.

According to various embodiments, the second magnetic field module 550 may be coupled to the third antenna 530 and configured to perform second short range communication through the second antenna 520 and the third antenna 530.

The electronic devices 400 and 1000 according to various embodiments may further include the second connecting unit 580 configured to control a connection between the third antenna 530 and the second magnetic field module 550, on the basis of driving of the second magnetic field module 550.

According to various embodiments, the second antenna 520 and the third antenna 530 may be coupled in parallel to the first antenna 510.

According to various embodiments, when the third antenna 530 and the second magnetic field module 550 are coupled, a third current path may be provided along the second magnetic field module 550, the second antenna 520, and the third antenna 530, and when the connection of the third antenna and the second magnetic field module is released, a fourth current path may be provided along the second magnetic field module 550 and the second antenna 520.

According to various embodiments, the second magnetic field module 550 may include the first circuit unit 710 coupled to the first antenna 510 and the second antenna 520 and configured to receive the power, and the second circuit unit 720 coupled to the second antenna 520 and the third antenna 530 and configured to perform the second short range communication.

According to various embodiments, the second magnetic field module 550 may include the second connecting unit 580 configured to control a connection between the third antenna 530 and the second magnetic field module 550.

According to various embodiments, the first short range communication may be Near Field Communication (NFC), and the second short range communication may be Magnetic Secure Transmission (MST).

According to various embodiments, the first charging scheme may be a magnetic resonance scheme, and the second charging scheme may be an electromagnetic induction scheme.

According to various embodiments, the first antenna 510 may be the first coil 1210 including the first terminals 511 and 1211 and second terminals 513 and 1213 which are coupled to the first magnetic field module 540 and the second magnetic field module 550. The second antenna 520 may be the second coil 1220 including the first terminals 521 and 1221 and second terminals 523 and 1223 which are coupled to the second magnetic field module 550. The third antenna 530 may be the third coil 1230 including the connecting terminals 531 and 1231 coupled to the second antenna 520 and the third terminals 533 and 1233 coupled to the second magnetic field module 550.

The electronic devices 400 and 1000 according to various embodiments may further include the shielding member 520 which shields a frequency band in which the first antenna 510, the second antenna 520, and the third antenna 530 operate, and the mounting member 540, stacked on the shielding member 1240, on which the first antenna 510, the second antenna 520, and the third antennas 530 are mounted.

According to various embodiments, the shielding member 1250 may include the first shielding member 1251 corresponding to the first antenna 510 and having an accommodating space provided therein, and the second shielding member 1255 corresponding to the second antenna 520 and accommodated in the accommodating space.

Figure 15:
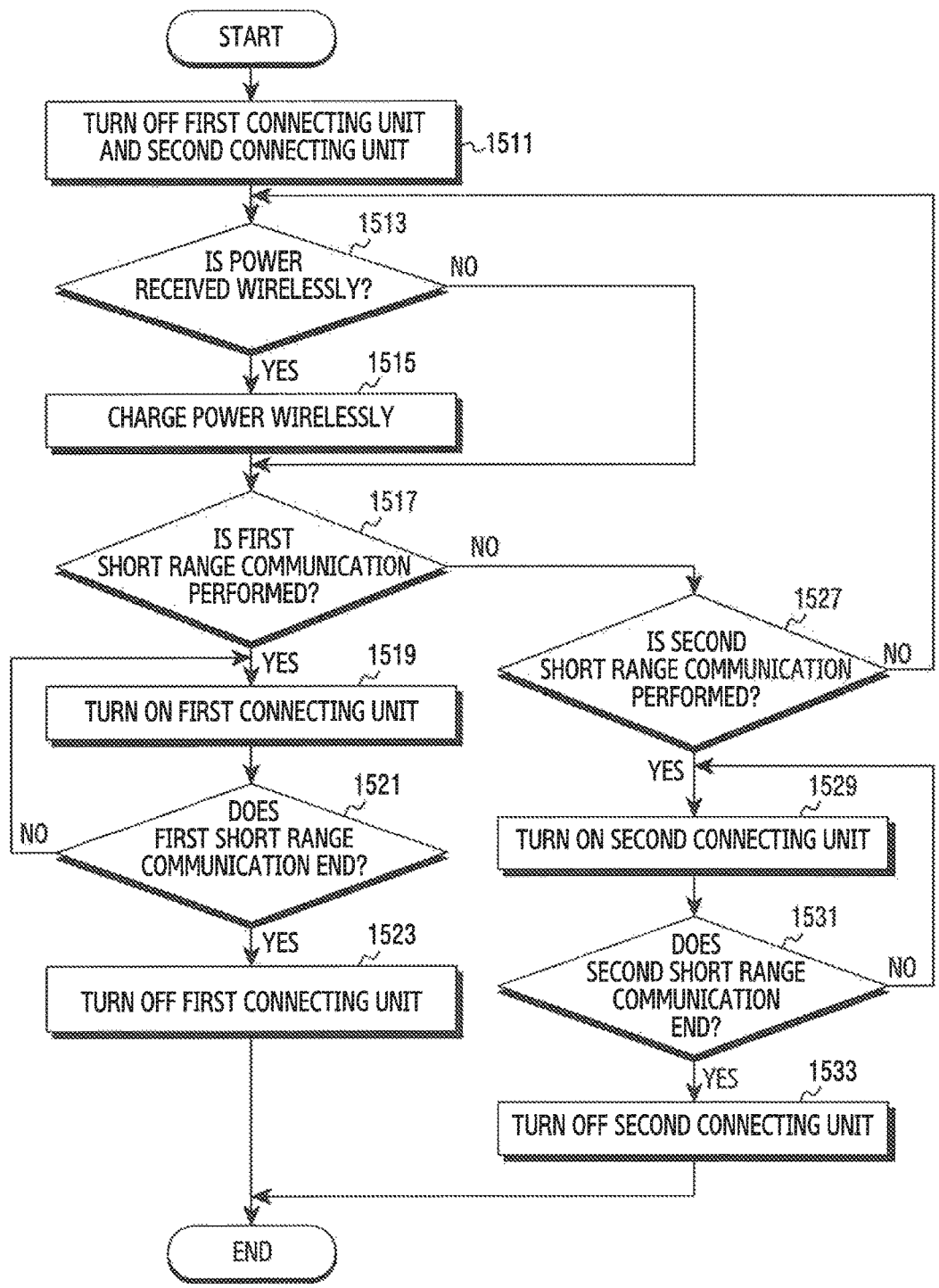
FIG. 15 is a flowchart of a method of operating an electronic device according to various embodiments.

FIG. 15 is a flowchart of a method of operating an electronic device according to various embodiments. In addition, FIG. 16, FIG. 17, FIG. 18, and FIG. 19 are circuit diagrams for explaining a method of operating an electronic device according to various embodiments.

Referring to FIG. 15, a method of operating the electronic device 400 according to various embodiments may start from operation 1511 in which the first connection unit 570 is turned off and the second connection unit 580 is turned off. When the first connection unit 570 is turned off, a connection between the first antenna 510 and the first magnetic field module 540 may be released. When the second connection unit 580 is turned off, a connection between the third antenna 530 and the second magnetic field module 500 may be released.

Next, upon receiving power wirelessly, the second magnetic field module 550 may detect this in operation 1513. In addition, the second magnetic field module 550 may charge power wirelessly in operation 1515. Upon detecting the power wirelessly, the second magnetic field module 550 may be activated. In this case, the second magnetic field module 550 may receive power through the first antenna 510 or the second antenna 520. Accordingly, the second magnetic field module 550 may store the power wirelessly in the charging unit 450.

Figure 16:
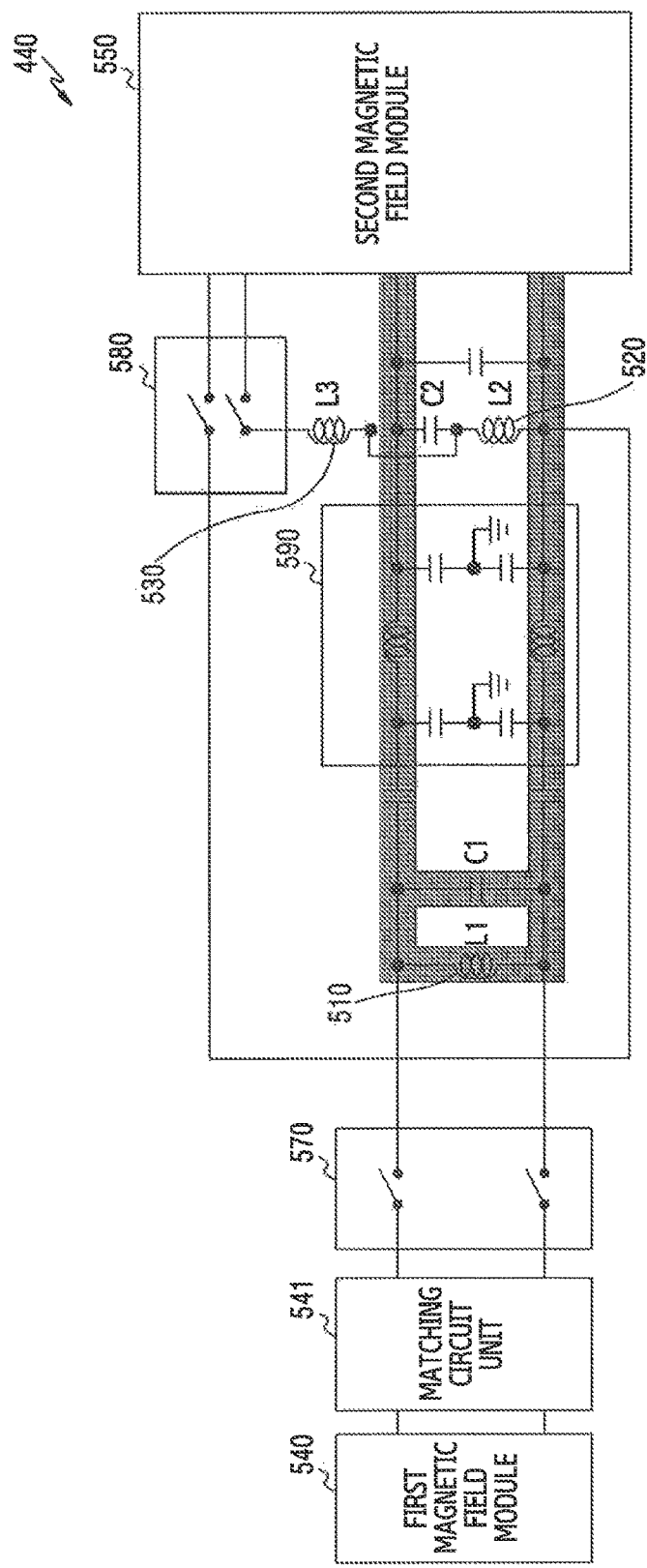
FIG. 16, FIG. 17, FIG. 18, and FIG. 19 are circuit diagrams for explaining a method of operating an electronic device according to various embodiments.

According to an embodiment, the second magnetic field module 550 may receive power through the first antenna 510 by using a first charging scheme. In this case, as shown in FIG. 16, a second current path may be provided along the first antenna 510 and the second magnetic field module 550. Accordingly, the second magnetic field module 550 may receive power along the second current path. For example, the first charging scheme may be a magnetic resonance scheme, and the second magnetic field module 550 may receive power through the first high frequency band $f_{11}$ by using the magnetic resonance scheme.

Figure 17:
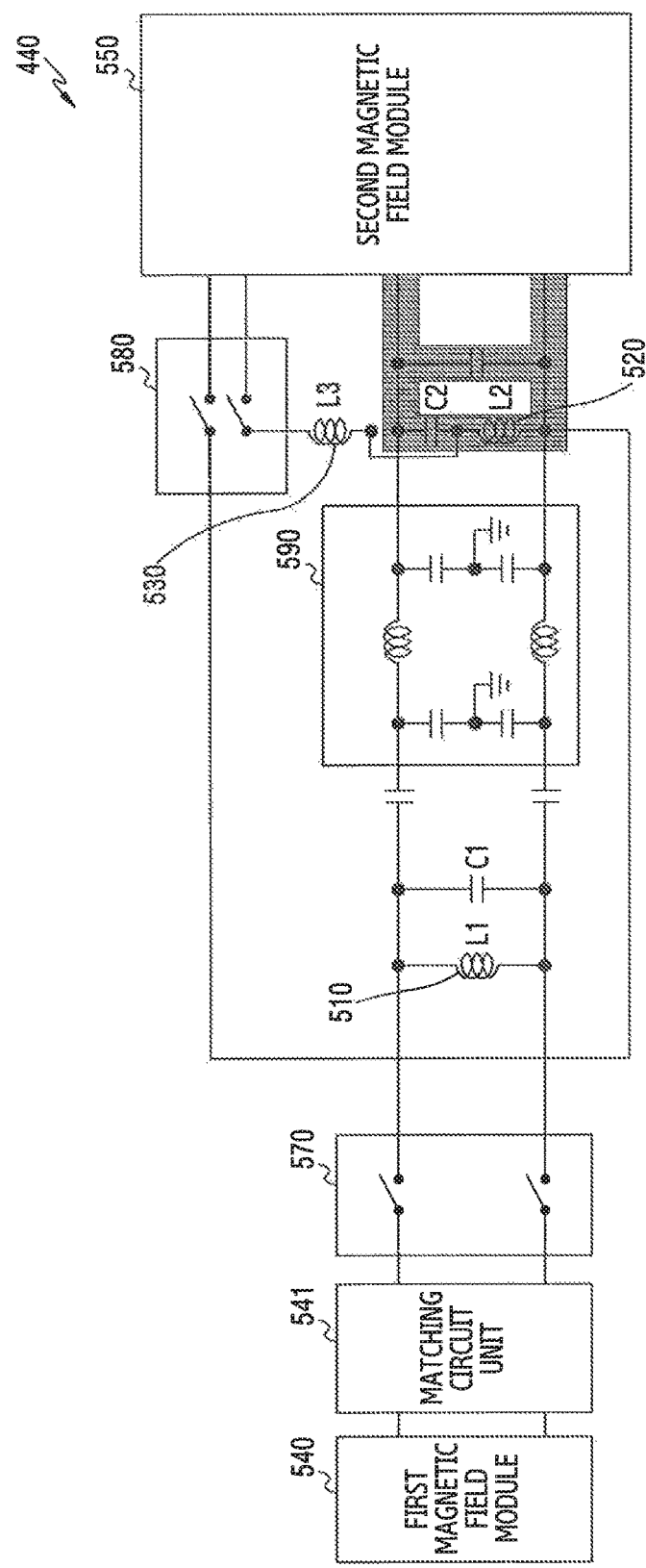

According to an embodiment, the second magnetic field module 550 may receive power through the second antenna 520 by using a second charging scheme. In this case, as shown in FIG. 17, a fourth current path may be provided along the second antenna 520 and the second magnetic field module 550. Accordingly, the second magnetic field module 550 may receive power along the fourth current path. For example, the second charging scheme may be an electromagnetic induction scheme, and the second magnetic field module 550 may receive power through the first low frequency band $f_{21}$ by using the electromagnetic induction scheme.

Meanwhile, if the power is not received wirelessly in operation 1513 and if first short range communication is performed, the control unit 470 may detect this in operation 1517. In addition, the control unit 470 may turn on the first connection unit 570 in operation 1519. When the first connection unit 570 is turned on, the first antenna 510 and the first magnetic field module 540 may be coupled. In this case, the control unit 470 may maintain an off state of the second connection unit 580. If the first short range communication is performed, the first magnetic field module 540 may be activated. Accordingly, the first magnetic field module 540 may perform the first short range communication. In this case, the first magnetic field module 540 may perform the first short range communication through the first antenna 510.

Figure 18:
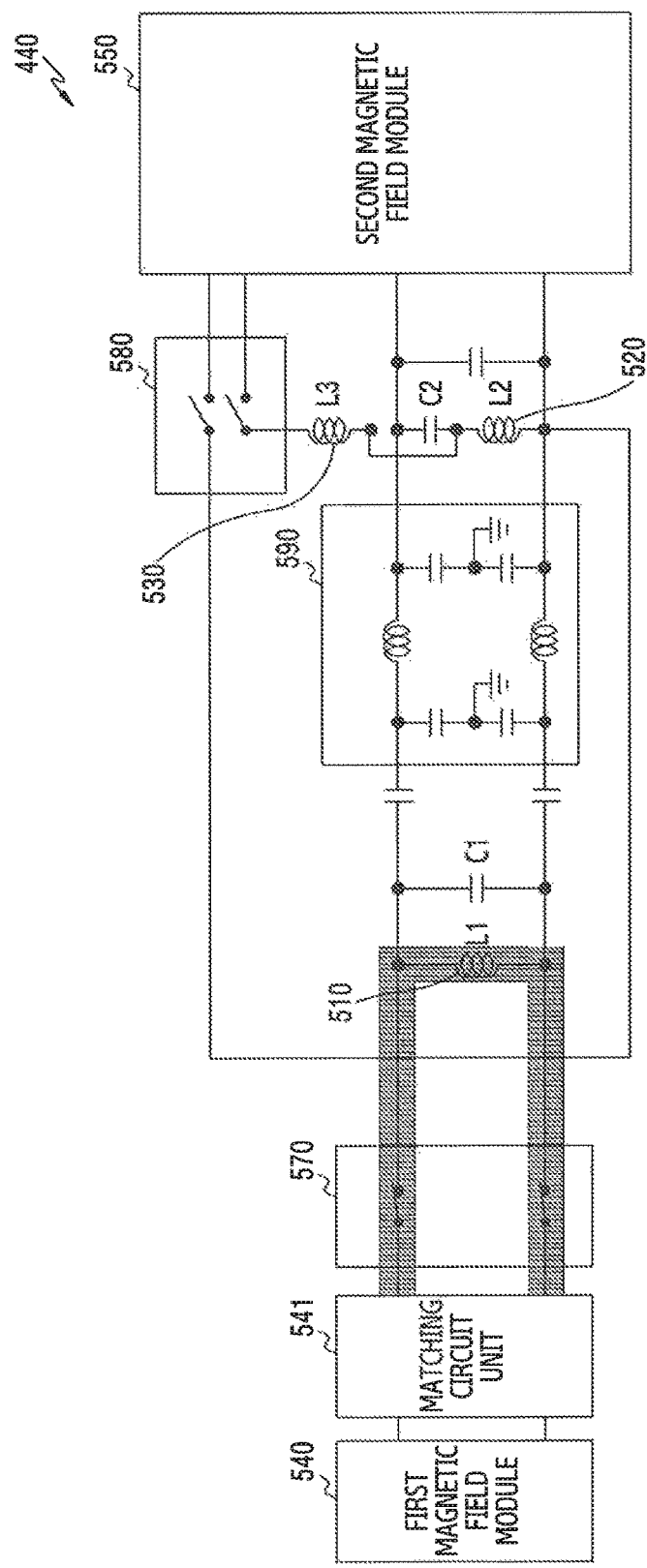

According to an embodiment, the first magnetic field module 540 may perform the first short range communication through the first antenna 510. In this case, as shown in FIG. 18, a first current path may be provided along the first antenna 510 and the first magnetic field module 540. Accordingly, the first magnetic field module 540 may perform the first short range communication along the first current path. For example, the first short range communication may be NFC, and the first magnetic field module 540 may perform the NFC through the second high frequency band $f_{12}$.

Next, when the first short range communication ends, the control unit 470 may detect this in operation 1521. In addition, the control unit 470 may turn off the first connection unit 570 in operation 1523. When the first short range communication ends, the first magnetic field module 540 may be deactivated. Accordingly, the method of operating the electronic device 400 according to various embodiments may end.

Meanwhile, if the first short range communication is not performed in operation 1517 and if second short range communication is performed, the control unit 470 may detect this in operation 1527. In addition, the control unit 470 may turn on the second connection unit 580 in operation 1529. When the second connection unit 580 is turned on, the third antenna 530 and the second magnetic field module 550 may be coupled. In this case, the control unit 480 may maintain an off state of the first connection unit 570. When the second short range communication is performed, the second magnetic field module 550 may be activated. Accordingly, the second magnetic field module 550 may perform the second short range communication. In this case, the second magnetic field module 550 may perform the second short range communication through the second antenna 520 and the third antenna 530.

Figure 19:
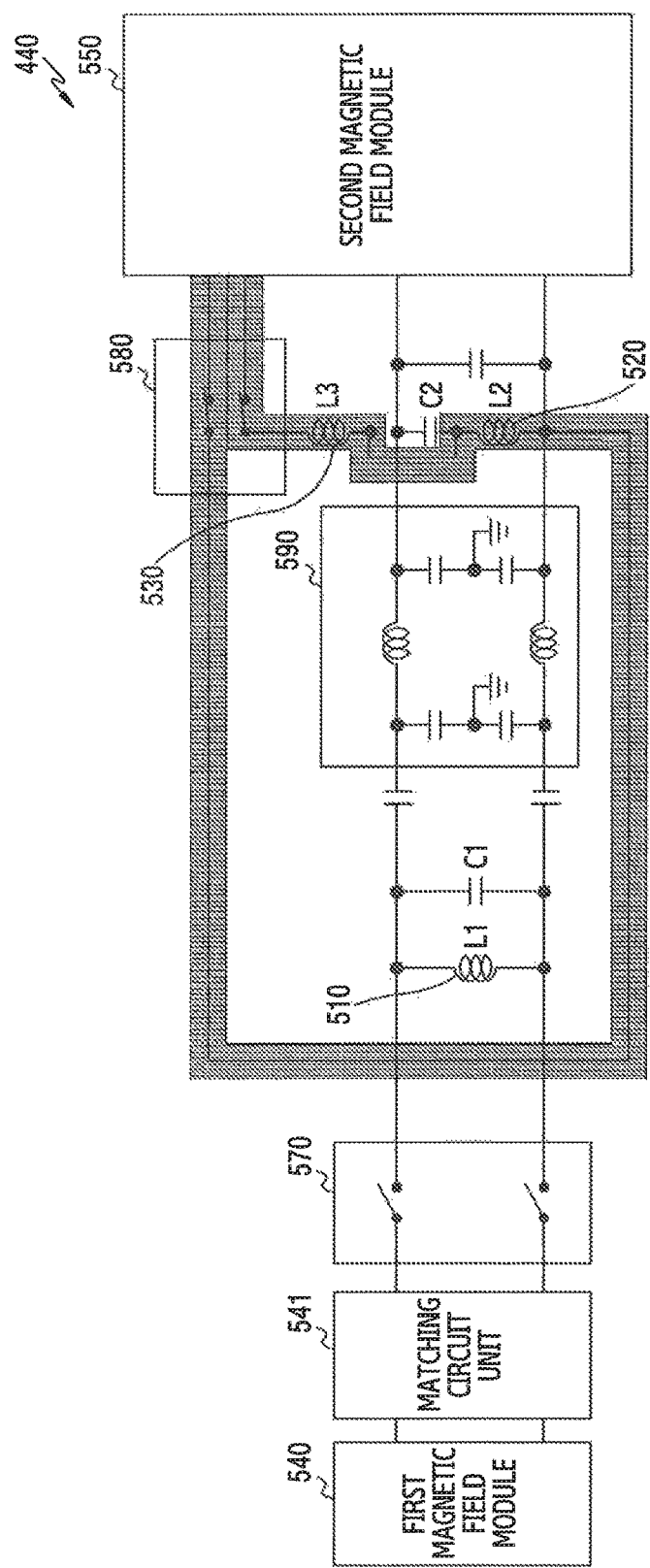

According to an embodiment, the second magnetic field module 550 may perform the second short range communication through the second antenna 520 and the third antenna 530. In this case, as shown in FIG. 19, a third current path may be provided along the second antenna 520, the third antenna 530, and the second magnetic field module 550. Accordingly, the second magnetic field module 550 may perform the second short range communication along the third current path. For example, the second short range communication may be MST, and the second magnetic field module 550 may perform the MST through the second low frequency band $f_{22}$.

Next, when the second short range communication ends, the control unit 470 may detect this in operation 1531. In addition, the control unit 470 may turn off the second connection unit 580 in operation 1533. When the second short range communication ends, the second magnetic field module 550 may be deactivated. Accordingly, the method of operating the electronic device 400 according to various embodiments may end.

A method of operating the electronic devices 400 and 1000 according to various embodiments may include releasing a connection between the first antenna 510 and the first magnetic field module 540, receiving power wirelessly through the first antenna 510 by the second magnetic field module 550 coupled to the first antenna 510, coupling the first antenna 510 and the first magnetic field module 540, and performing first short range communication through the first antenna 510 by the first magnetic field module 540.

The method of operating the electronic devices 400 and 1000 according to various embodiments may further include releasing a connection between the second magnetic field module 550 and the third antenna 530 extended from the second antenna 520, wherein the second magnetic field module 550 is coupled to the second antenna 520, receiving power wirelessly through the second antenna 520 by the second magnetic field module 550, coupling the third antenna 530 and the second magnetic field module 550, and performing second short range communication through the second antenna 520 and the third antenna 530 through the second magnetic field module 550.

According to various embodiments, the second magnetic field module 550 may be configured to receive power through the first antenna 510 by using a first charging scheme, and receive power through the second antenna 520 by using a second charging scheme.

According to various embodiments, the coupling of the first magnetic field module 540 may maintain a connection release between the third antenna 530 and the second magnetic field module 550.

According to various embodiments, the coupling of the second magnetic field module 550 may maintain a connection release between the first antenna 510 and the first magnetic field module 540.

According to various embodiments, the first short range communication may be Near Field Communication (NFC), and the second short range communication may be Magnetic Secure Transmission (MST).

According to various embodiments, the first charging scheme may be a magnetic resonance scheme, and the second charging scheme may be an electromagnetic induction scheme.

According to various embodiments, the electronic devices 400 and 1000 may commonly use the first antenna 510 in the first short range communication scheme and the first charging scheme, and may commonly use the second antenna 520 in the second short range communication scheme and the second charging scheme.

Accordingly, although the electronic devices 400 and 1000 support many magnetic field schemes, a space for mounting the antennas 510, 520, and 530 can be decreased in the electronic devices 400 and 1000. Therefore, the electronic devices 400 and 1000 can be implemented to have a compact size. In addition, even if many magnetic field schemes are supported in the electronic devices 400 and 1000, a material cost for mounting the antennas 510, 520, and 530 can be decreased in the electronic devices 400 and 1000. Alternatively, the electronic devices 400 and 1000 can be designed by increasing a width of a winding of a pattern, e.g., the coils 1210, 1220, and 1230, in the antennas 510, 520, and 530 since the space for mounting the antennas 510, 520, and 530 is ensured, thereby decreasing a resistance component of the antennas 510, 520, and 530 in the electronic devices 400 and 1000. Accordingly, performance of the antennas 510, 520, and 530 can be improved in the electronic devices 400 and 1000. In addition, the electronic devices 400 and 1000 control a connection between the magnetic field modules 540 and 550, thereby avoiding interference between the magnetic field modules 540 and 550. That is, the magnetic field modules 540 and 550 can be separated from each other in the electronic devices 400 and 1000. Accordingly, performance of the magnetic field modules 540 and 550 can be improved in the electronic devices 400 and 1000.

What is claimed is:

1. An electronic device comprising:
   a first antenna;
   a second antenna;
   a third antenna extended from the second antenna;
   a first magnetic field module coupled to the first antenna and configured to perform first short range communication through the first antenna; and
   a second magnetic field module coupled to the first antenna, the second antenna, and the third antenna, and configured to receive power wirelessly through the first antenna, by using a first charging scheme, to receive power through the second antenna by using a second charging scheme, and to perform second short range communication through the second antenna and the third antenna.

2. The electronic device of claim 1, further comprising:
   a first connecting unit configured to control a connection between the first antenna and the first magnetic field module, based on driving of the first magnetic field module,
   wherein when the first magnetic field module is not driven, the first connecting unit is further configured to release the connection between the first antenna and the first magnetic field module, or
   wherein when the first magnetic field module is driven, the first connecting unit is further configured to couple the first antenna and the first magnetic field module.

3. The electronic device of claim 2,
   wherein when the first antenna and the first magnetic field module are coupled, a first current path is provided along the first antenna and the first magnetic field module, and
   wherein when the connection of first antenna and the first magnetic field module is released, a second current path is provided along the first antenna and the second magnetic field module.

4. The electronic device of claim 1, further comprising:
   a second connecting unit configured to control a connection between the third antenna and the second magnetic field module, based on driving of the second magnetic field module,
   wherein when the second magnetic field module is driven to perform the second short range communication, the second connecting unit is further configured to couple the third antenna and the second magnetic field module, or
   wherein when the second magnetic field module is driven to receive the power by using the second charging scheme, the second connecting unit is further configured to release the connection between the third antenna and the second magnetic field module.

5. The electronic device of claim 4,
   wherein when the third antenna and the second magnetic field module are coupled, a third current path is provided along the second antenna, the third antenna and the second magnetic field module, and
   wherein when the connection of the third antenna and the second magnetic field module is released, a fourth current path is provided along the second antenna and the second magnetic field module.

6. The electronic device of claim 1,
   wherein the first charging scheme is a magnetic resonance scheme, and wherein the second charging scheme is an electromagnetic induction scheme.

7. The electronic device of claim 1, wherein the second antenna and the third antenna are coupled in parallel to the first antenna.

8. The electronic device of claim 1, wherein the second magnetic field module comprises:
a first circuit unit coupled to the first antenna and the second antenna and configured to receive the power; and
a second circuit unit coupled to the second antenna and the third antenna and configured to perform the second short range communication.

9. The electronic device of claim 1,
wherein the first short range communication is near field communication (NFC), and
wherein the second short range communication is magnetic secure transmission (MST).

10. The electronic device of claim 1,
wherein the first antenna is a first coil comprising a first terminal and a second terminal which are coupled to the first magnetic field module and the second magnetic field module,
wherein the second antenna is a second coil comprising a first terminal and a second terminal which are coupled to the second magnetic field module, and
wherein the third antenna is a third coil comprising a connecting terminal coupled to the second antenna and a third terminal coupled to the second magnetic field module.

11. The electronic device of claim 1, further comprising:
a shielding member which shields a frequency band in which the first antenna, the second antenna, and the third antenna operate; and
a mounting member, stacked on the shielding member, on which the first antenna, the second antenna, and the third antennas are mounted.

12. The electronic device of claim 11, wherein the shielding member comprises:
a first shielding member corresponding to the first antenna and having an accommodating space provided therein; and
a second shielding member corresponding to the second antenna and accommodated in the accommodating space.

* * * * *